United States Patent [19]

Arikawa

[11] Patent Number: 4,979,784
[45] Date of Patent: Dec. 25, 1990

[54] ANTI-SKID CONTROL APPARATUS FOR A VEHICLE BRAKING SYSTEM

[76] Inventor: Tetsuro Arikawa, 4-12 Urago-Cho, Yokosuka-shi, Kanagawa-Ken, Japan

[21] Appl. No.: 212,517

[22] Filed: Jun. 28, 1988

[30] Foreign Application Priority Data

Jun. 30, 1987 [JP] Japan .................. 62-164376
Sep. 8, 1987 [JP] Japan .................. 62-225094

[51] Int. Cl.$^5$ .............................................. B60T 8/32
[52] U.S. Cl. .................... 303/111; 303/96; 303/100
[58] Field of Search ............ 303/95, 96, 98, 100, 303/103, 106, 109, 110, 111; 188/181 C, 181 R; 364/426.02

[56] References Cited

U.S. PATENT DOCUMENTS

| | | | |
|---|---|---|---|
| 3,909,070 | 9/1975 | Leiber | 303/109 |
| 3,972,568 | 8/1976 | Fleischer | 303/106 |
| 3,980,346 | 9/1976 | Leiber | 303/100 |
| 4,547,022 | 10/1985 | Brearley et al. | 303/111 |
| 4,652,060 | 3/1987 | Miyake | 303/111 X |
| 4,657,313 | 4/1987 | Fennel et al. | 303/96 |
| 4,717,209 | 1/1988 | Hagiya et al. | 303/111 |
| 4,762,376 | 8/1988 | Matsubura | 303/111 X |

FOREIGN PATENT DOCUMENTS 0085052  5/1985  Japan ................... 303/111
0285164 12/1986  Japan .
1461166  1/1977  United Kingdom .

Primary Examiner—Douglas C. Butler
Attorney, Agent, or Firm—Jones, Day, Reavis & Pogue

[57] ABSTRACT

An anti-skid control apparatus for a vehicle includes fluid pressure control valve devices arranged between a tandem master cylinder and the front wheels of the vehicle, and a control unit receiving outputs of wheel speed sensors to assess skid conditions of the wheels and to control the valve devices. The apparatus discriminates between "low side" and "high side" of the road by assessing skid conditions of either the rear wheels or the front wheels. The braking pressure of the rear or front wheel that is on the low side and that of the wheel connected diagonally to it are controlled in either a "select-high" or a "select-low" manner, and the pressures of the other diagonally opposite wheels are controlled in the opposite manner. In the alternative, the apparatus may assess the skid condition of the one rear wheel based on the larger of the braking frictional coefficients of the sides of the road, on the basis of the acceleration and slip conditions of the one rear wheel, while it judges the skid condition of the other rear wheel on the smaller one of the braking frictional coefficients of the sides of the road only on the basis of the acceleration condition of the other rear wheel, and the braking pressures of the respective conduit systems are controlled in the select-low manner.

10 Claims, 11 Drawing Sheets

ANTI-SKID CONTROL APPARATUS FOR A VEHICLE BRAKING SYSTEM

BACKGROUND OF THE INVENTION

1. Field of the Invention:

This invention relates to an anti-skid control locking of the wheels.

2. Description of the Prior Art:

An anti-skid control apparatus for a vehicle braking system is known that includes fluid pressure control valve devices arranged between fluid pressure generating chambers of a tandem master cylinder and the wheel cylinders of the front wheels, respectively, and a control unit receiving outputs of wheel speed sensors for measuring or judging the skid conditions of the front and rear wheels and for generating instructions for controlling the fluid pressure control valve devices.

When the fluid pressure control valve device is provided for each of four wheels (four channels), and their fluid pressures are are independently controlled, there is no problem of controlling operation Or when the fluid pressure control valve device is provided for each of the front wheels, and for both of the rear wheels in common (three channels), there is no problem of controlling operation In the latter case, the one common fluid pressure control valve device is controlled on the basis of the lower one of the speeds of the rear wheels However, in the above cases, three or four fluid pressure control valve devices are used. Accordingly, the whole anti-skid control apparatus is large-sized, and very heavy. Since the fluid pressure control valve device is expensive, the system is expensive.

Accordingly, such apparatus have been proposed that the brake fluid pressures of the front wheels are controlled by the two fluid pressure control valve devices, respectively, and those of the rear wheels diagonally connected to the front wheels are controlled by the same fluid pressure control valve devices, respectively in common with those of the front wheels. The diagonal conduit system or X-type conduit system has been widely used as the counter-measure against the failure of the brake fluid conduits. However, when the brake pressures of the front and rear wheels diagonally connected to each other are controlled in the "select high" manner that the brake pressures are controlled on the basis of the rotational behaviour of the one of the front and rear wheels whose frictional coefficient $\mu$ is higher between its tire and the road, than the other the one wheel on the higher coefficient $\mu$ road side is controlled so as not to be locked, on the road (split-road) whose frictional coefficients are different between the right and left sides, but the other road on the lower coefficient $\mu$ road side might be locked At that time, the running or directional stability of the vehicle is lost.

When the brake pressures of the front and rear wheels diagonally connected to each other are controlled in the "select low" manner that the brake pressures are controlled on the basis of the rotational behaviour of the one of the front and rear wheels whose frictional coefficient $\mu$ is lower between its tire and the road, than the other of them, both of the one and other wheels on the lower and higher coefficients road sides are controlled so as not to be locked, on the split-road.

However, the brake pressure of the other wheel on the higher $\mu$ side is unnecessarily decreased. Accordingly the braking distance is unreasonably lengthened.

SUMMARY OF THE INVENTION

Accordingly, it is an object of this invention to provide an anti-skid control apparatus for a vehicle braking system which is light and can reduce cost, and by which the running or directional stability of the vehicle can be secured and sufficient braking force can be obtained.

In accordance with an aspect of this invention, in an anti-skid control apparatus for a vehicle braking system including: (A) a pair of front wheels and a pair of rear wheels which are diagonally connected with each other; (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices; the improvement in which said control unit discriminates between the frictionally lower one and higher one (designated as "low side" and "high side", respectively) of the sides of the road on which said wheels are running, on the basis of the measuring or judging results of the skid conditions of said rear wheels, and the braking pressures of the one rear wheel on the low side and of the one front wheel connected diagonally to said one rear wheel are controlled in the "select-high" manner, and the braking pressures of the other rear wheel on the high side and of the other front wheel connected diagonally to said other rear wheel are controlled in the "select-low" manner.

In accordance with another aspect of this invention, in an anti-skid control apparatus for a vehicle braking system including: (A) a pair of front wheels and a pair of rear wheels which are diagonally connected with each other; (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices; the improvement in which said control unit discriminates between the frictionally lower one and higher one (designated as "low-side" and "high-side", respectively) of the sides of the road on which said wheels are running, on the basis of the measuring or judging results of the skid conditions of said front wheels, and the braking pressures of the one front wheel on the low side and of the one rear wheel connected diagonally to said one front wheel are controlled in the "select-low" manner, and the braking pressures of the other front wheel on the high side and of the other rear wheel connected diagonally to said other from wheel are controlled in the "select-high" manner.

In accordance with a further aspect of the invention, in an anti-skid control apparatus for a vehicle braking system including; (A) a pair of front wheels and a pair of rear wheels which are diagonally connected with each other; (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices; the improvement in which said control unit judges the skid condition of the one rear wheel on the larger one of the braking frictional coefficients of the sides of the road on which said wheels are running, on the basis of the acceleration condition and slip condition of said one rear wheel, while it judges the skid condition of the other rear wheel on the smaller one of the braking frictional coefficients of the sides of the road on which said wheels are running, only on the basis of the acceleration condition of said other rear wheel, and the braking pressures of said front and rear wheels of the respective conduit systems are controlled in the select-low manner.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
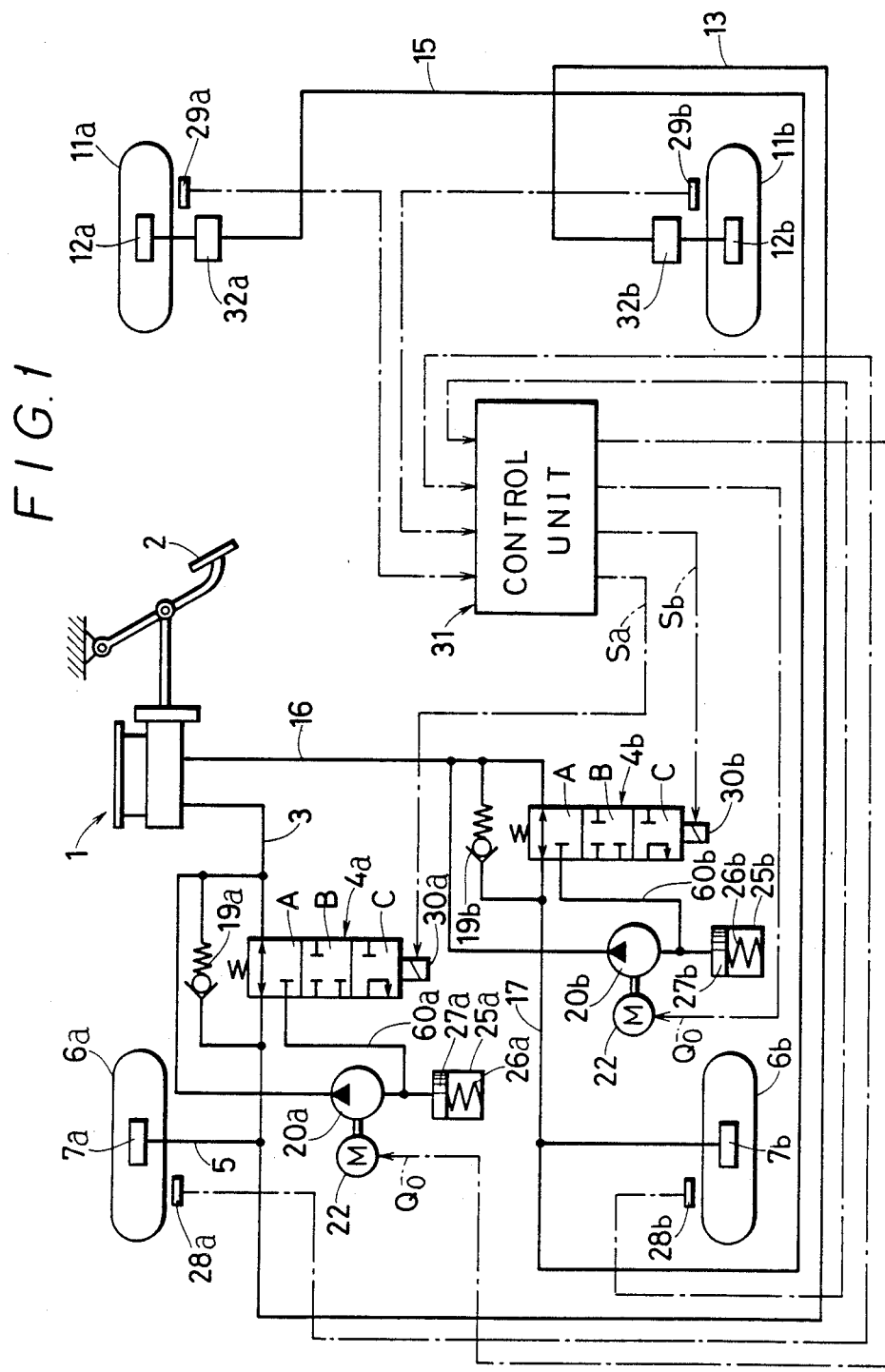
FIG. 1 is a schematic view of an anti-skid control apparatus according to a first embodiment of this invention.

In FIG. 1, a brake pedal 2 is connected to a tandem master cylinder 1 One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of the left front wheel 6b through the conduit 16, an electro-magnetic three position valve device 4b and a conduit 17. The conduit 17 is further connected to a wheel cylinder 12a of a right rear wheel 11a through a conduit 15 and a proportioning valve 32a.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to casings and relatively weak springs 26a and 26b. Reserving chambers of the reservoirs 25a and 25b are connected to suction openings of fluid pressure pumps 20a and 20b.

Although the fluid pressure pumps 20a and 20b are schematically shown, each of them consist of a pair of casings, pistons slidably fitted to the casings, an electro-motor 22 reciprocating the piston, and check valves. Supply openings of the fluid pressure pump 20a and 20b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, are supplied to a control unit 31 according to this invention.

Although described hereinafter in detail, the control unit 31 consists of a judge part, a selection part and a logic part. Output terminals of the wheels speed sensors 28a, 28b, 29a and 29b are connected to input terminals of the judge part. The judge par&. receives the wheel speed signals, judges them and supplies the judge results to the selection part and the logic part. As will be hereinafter described, the outputs of the selection part and the judge results are logically combined with each other in the logic part. Control signals Sa and Sb, and motor drive signals Qo as the calculation or measurement results are generated from the control unit 31, and are supplied to solenoid portions 30a and 30b of the valve devices 4a and 4b and motor 22, respectively. Dashed lines represent electric lead wires.

Although schematically shown, the electromagnetic valves devices 4a and 4b have well-known constructions.

The valve devices 4a and 4b take anyone of three positions A, B and C in accordance with the current intensities of the control signals Sa and Sb.

When the control signals Sa and Sb are "0" in current level, the valve devices 4a and 4b take the first positions A for increasing the brake pressure to the brake for the wheel, respectively. In the first position A, the master cylinder side and the wheel cylinder side are connected to. When the control signals Sa and Sb are "½" in current level, the valve devices 4a and 4b take the second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a and 4b take the third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates a drive signal Qo for the motor 22. When any one of the control signals Sa and Sb becomes initially "1", the drive signal Qo is generated, and it is kept during the skid control operation. The drive signal Qo is supplied to the motor 22.

The wheels 6a, 6b, 11a and 11b are diagonally connected to each other in the above described manner. Next, the detail of the control unit 31 still be described with reference to FIG. 2 and FIG. 3.

The output signals of the wheel speed sensors 28a, 29b and 28b, 29a are supplied to the wheel speed signal generators 34a, 35a and 34b, 35b, respectively.

Digital output or analog output proportional to the wheel speeds are obtained from the wheel speed signal generators 34a, 35a and 34b, 35b and they are supplied to approximate vehicle speed signal generators 36a, 36b, high-select circuits 39a, 39b and low-select circuits 40a, 40b.

The approximate vehicle speed signal generators 36a, 36b are well known, which are, for example, disclosed in the Japanese Patent Opening Gazette 285164/1986, and they receive wheel speed signals of the front and rear wheels of the same conduit systems and generate approximate vehicle speed signals E on the basis of the change of the higher one of the wheel speed signals of the front and rear wheels. The signals E are supplied to slip measuring circuits 37a, 37b and further to skid signal generating circuits 41a, 41b, respectively. The wheel speed signals obtained from the wheel speed sensors 29b, 29a of the rear wheels are supplied to the slip measuring circuits 37a, 37b, too.

The slip measuring circuits 37a, 37b calculate the differences between the approximate vehicle speed signals E and the wheel speeds V of rear wheels. The outputs thereof are supplied to a slip comparator 38. The output λs of the C comparator 38 is "1" when the output λL of the slip measuring circuits 37a is larger than the output λR of the other slip measuring circuit 37b, and it is "0", when the output λL is smaller than the output λR. The signal λS is supplied to the high-select circuit 39a and the low-select circuit 40b, and further through a NOT gate 48 to the low-select circuit 40a and high-select circuit 39b.

Outputs of the high-select circuits 39a, 39b and low-select circuits 40a, 40b are supplied to the skid signal generators 41a, 41b and the output signals of the skid signal generating circuits 41a, 41b are supplied to logic circuits 42a, 42b. The outputs of the logic circuits 42a, 42b are amplified by amplifiers 43a and 43b. Thus, the control signals Sa and Sb shown in FIG. 1 are obtained in the control unit 31. The control signals Sa and Sb take three levels as "0", "½" and "1". The signal of level "½" represents the signal EV1, or EV2 and signal of the level "1" represents the signal AV1 or AV2.

The skid signal generating circuits 41a, 41b are constructed in the well known manner and they receive the outputs of the high-select circuits 39a, 39b and outputs of the low-select circuits 40a, 40b. In the skid-signal generators 41a and 41b, they are differentiated with respect to time and then acceleration signals and deceleration signals are generated. The wheel speeds are compared with the approximate vehicle speed signal E, and as result, a slip signal is generated. The high-select circuits 39a, 39b receive the out-puts of the former-stage wheel speed generators 34a, 34b and 35a, 35b. When the gates thereof are opened by the output λs of the comparator 38, the higher ones of the wheel speeds of them are selected and supplied to the skid signal generating circuits 41a, 41b. Similarly the low-select circuits 40a, 40b receive the output of the wheel speed signal generators 34a, 35a and 34b, 35b. When the gates thereof are opened by the output λs of the comparator 38, the lower ones of the output signals are selected and are supplied to the skid signal generating circuits 41a, 41b. The outputs of the skid signal generating circuits 41a, 41b for example, acceleration signals, deceleration signals and slip signals are supplied to the logic circuits 42a, 42b. As well known, such skid signals are combined logically in the logic circuits 42a, 42b. It is judged whether the brake should be relieved or not, should be maintained at constant or not, or should be raised or not in the logic circuits 42a and 42b. The judging above signals AV1, AV2 or EV1, EV2 are generated as the result.

Figure 2:
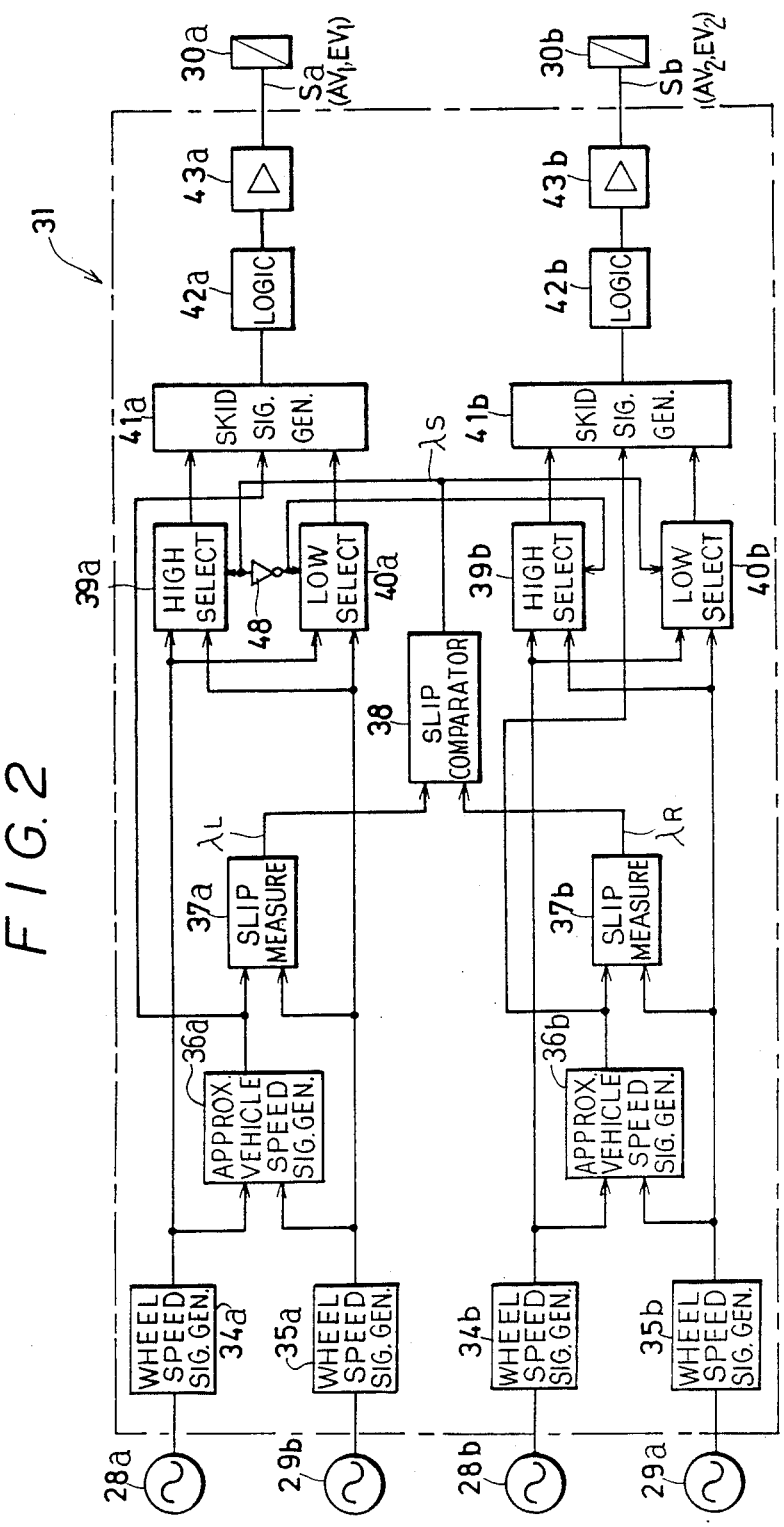
FIG. 2 is a circuit diagram of a control unit in FIG. 1.
Figure 3:
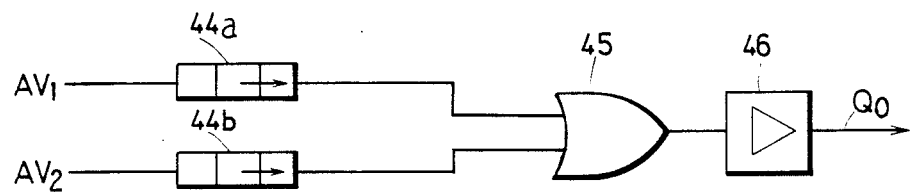
FIG. 3 is a circuit diagram of a motor drive circuit in the control unit.

Although not shown in FIG. 2, the control unit 31 includes a motor driving circuit shown in FIG. 3. It consists of off-delay timers 44a, 44b, an OR gate 45 and an amplifire 46. The output signals AV1, AV2 are supplied to the off delay timers 44a, 44b. The outputs of the off-delay timers 44a, 44b are supplied to the OR-gate 45, and they are amplified by the amplifier 46. Thus, the motor drive signal Qo is obtained from the motor drive circuit. The delay times of the off-delay timers 44a, 44b are so designed as to be longer than the possible longest time between the present output signal AV1 or AV2 and the subsequent output signal AV1 or AV2 which are generated during the anti-skid control. As the result, once the outputs of the off-delay timers 44a, 44b become "1", they are continuously maintained during the anti-skid control.

Next, operations of the above described anti-skid apparatus will be described.

It is now assumed that the frictional coefficient μ of the right side of the road is low and that of the left side of the road is high. The detecting outputs of the wheel speed sensors 28a, 29b, 28b, 29a are supplied to the wheel speed signal generating circuits 34a, 34b, 35a and 35b respectively. Wheel speed signals are generated from the wheel speed signal generators 34a, 34b, 35a and 35b, and they are supplied to the approximate vehicle speed signal generators 36a, 36b. The higher ones of the wheel speed generators 36a and 36b in the respective conduit systems. In the well known manner, approximate vehicle speeds are calculated on the basis of the changes of the higher wheel speed signals.

The approximate vehicle speed signals E from the generators 36a, 36b are supplied to the slip measuring circuits 37a and 37b. The wheel speed signals of the left rear wheel 11b and right rear wheel 11a are supplied to the other input terminals of the slip measuring circuits 37a, 37b, respectively. Slip amounts are calculated in the circuits 37a and 37b. The outputs of the slip measuring circuits 37a, 37b are supplied to the comparator 38.

Since the right side of the road is frictionally low, the slip amount of the right rear wheel 11a is larger than that of the left rear wheel 11b. Thus the output λR is larger than the output λL between the outputs λR and λL of the slip measuring circuits 37a, 37b. Accordingly the output λs of the comparator 38 is "0", and it is supplied to the high-select circuit 39a and low-select circuit 40b. On the other hand, it is supplied through the NOT gate 48 to the low-select circuit 40a and the other high-select circuit 39b. Since the supplied signal λs is "0", the low-select control is effected in the one conduit system of the wheel speed sensors 28a, 29b, while the high-select control is effected in the other conduit system of the wheel speed sensors 28b, 29a.

Thus in the one conduit system, the wheel speed of the right front wheel 6a and that of the left rear wheel 11b are supplied to the low-select circuit 40a. Since the gate of the circuit 40a is opened, the wheel speed of the right front wheel 6a is selected by the low-select circuit 40a, since the right front wheel 6a is running on the low-μ side and the left rear wheel 11b is running on the high-μ side. The selected wheel speed signal is supplied to the following stage skid signal generating circuit 41a. Thus the skid condition of the right front wheel 6a is calculated in the skid signal generating circuit 41a. In the well-known manner, deceleration signal, acceleration signal or slip signal is generated in accordance with the skid condition of the right front wheel 6a. They are supplied to the logic circuit 42a. They are logically combined with each other. It is judged whether the brake should be relieved or not, should be maintained at constant or not, or should be raised or not. The control signal Sa which consists of the signals AV1, and EV1, is generated on the basis of the above judgement. When the brake should be relieved, the level of the control signal Sa is "1". Thus the signal AV1 is generated. When the brake should be maintained at constant, the level of the control signal Sa is "½". Thus the signal EV1 is generated. When the brake should be raised or should be slowly raised, the signal EV1 is changed pulseurse in the well known manner. The brake increase and holding are repeated at the predetermined intervals. As above described, the control signal Sa consists of the signals AV1 and EV1. They are supplied to the solenoid portion 30a of the change-over valve 4a in FIG. 1. The change-over valve 4a takes the position A, B or C in accordance with the level of the signal Sa. The brake is relieved, maintained at constant or slowly increased in accordance with the position of the change-over valve 4a. Or the brake is rapidly increased.

In the other conduit system, the select-high control is effected and the high-select circuit 39b is opened. The wheel speed signals of the left front wheel 28b and right rear wheel 29a are supplied to the high-select circuit 39b. The higher one of the wheel speed signals is selected by the high-select circuit 39b and it is supplied to the skid signal generating circuit 41b.

In the circuit 41b, the skid condition of the higher one of the wheel speeds is calculated and the deceleration signal, acceleration signal or slip signal is generated in accordance with the skid condition of the higher one of the wheel speeds. They are logically combined with each other in the logic circuit 42b. Thus it is judged whether the brake should be relieved, or not, should be maintained at constant or not, should be slowly raised or rapidly increased. The control signal Sb which consists of the signal AV2 and EV2, is generated from the logic circuit 42b. It is supplied to the solenoid portion 30b of the change-over valve 4b in FIG. 1. The change-over valve 4b takes the position A, B or C. The brake of the other conduit system is decreased, rapidly increased, maintained at constant or slowly increased in accordance with the position of the change-over valve 4b.

In the above described manner, the slip amounts of the rear wheels 11a, 11b both are compared with each other and the one side of the road on which the one rear wheel of larger slip amount is running, is judged to be low side. Thus, the front wheel 6b diagonally connected to the right rear wheel 11a and the latter are controlled in the select-high manner. Accordingly, the rear wheel 11a on the low-μ side might be locked. However the front wheel 6b on the high-μ side is prevented from locking. In the other conduit system, the slip amount of the left rear wheel 11b is smaller and so it is judged that the left side of the road is frictionally high. Thus, the select-low control is effected for this conduit system. Accordingly, the right front wheel 6a on the low-μ side is prevented from locking. Further, in this conduit system also the rear wheel 11b is prevented from locking.

As above described, both of the front wheels 6a, 6b are not locked. Accordingly, the steering ability of the vehicle is secured. Further, the brake distance can be shortened more than the prior art.

When the signal AV1, or AV2, namely the brake relieving signal is generated in any of the conduit systems, the output of the off-delay timers 44a or 44b becomes "1" and it is supplied through the OR gate 45 to the amplifier 46. The amplified output is the motor drive signal Qo, which is supplied to the motor 22 in FIG. 1. Thus]the fluid pressure pumps 20a, 20b start to drive. The change-over valve 4a or 4b takes a position C with the generation of signal AV1 or AV2. Accordingly the pressurized fluid is discharged to the reservoir 25a or 25b through the conduit 60a or 60b from the wheel cylinder. It is sucked up by the fluid pressure pump 20a, 20b and transmitted to the conduit 3a or 16a side. In the above described manner, when the signal AV1 or AV2 is generated, the motor drive signal Qo is generated. The drive signal Qo is maintained ¢1" during the anti skid control operation. Thus, the fluid pressure pumps 20a, 20b are continuously driven.

Next, the second embodiment of this invention will be described with reference to FIG. 4.

In this embodiment, the arrangement except the control
31 is the same as the arrangement of the first embodiment. Accordingly, a control unit of this embodiment is denoted by a reference numeral 31'. Further, parts in FIG. 4 which correspond to those in FIG. 2 are denoted by the same reference numerals, the description of which will be omitted.

In this embodiment, the wheel speed signals of the rear wheels from the wheel speed signal generators 35a, 35b are supplied to a speed signal comparator 47. The output signal Vs of the comparator 47 is "0", when the wheel speed of the left rear wheel 11b or the output of the wheel speed signal generating circuit 35a is larger than the wheel speed of the right rear wheel 11a or the output of the wheel speed signal generating circuit 35b. And it is "1", when the former is smaller than the latter. The output signal Vs of the comparator 47 is supplied to the high-select circuit 39a and low-select circuit 40b, and further it is supplied to the low-select circuit 40a and high-select circuit 39b through the NOT gate 48.

In operation, it is assumed as in the first embodiment that the right side of the road is low-$\mu$ side and the left side thereof is high-$\mu$ side. The wheel speed of the left rear wheel or the output of the wheel speed signal generating circuit 35a is higher than the wheel speed of the right rear wheel or the output of the other wheel speed signal generating circuit 35b. The output Vs of the comparator 47 becomes "0". It is supplied to the high-select circuit 39a in the one conduit system. Since it is "0", the gate of the circuit 39a remains closed. It is supplied to the low-select circuit 40b in the other conduit system. The gate of the circuit 40b remains closed. On the other hand, it is inverted by the NOT gate 48, and so the gates of the low-select circuit 40a and high-select circuit 39b are opened. The conduit system to which the right front wheel 6a and the left rear wheel 11b belong, is controlled in the select-low manner, while the other conduit system to which the left front wheel 6b and the right rear wheel 11a belong, is controlled in the select-high manner. In the one conduit system, the lower one of the wheel speeds of the right front wheel and the left rear wheel is selected by the low-select circuit 40a. Thus, the wheel speed of the front wheel 6a running on the low-$\mu$ side is selected by the circuit 40a, and it is supplied to the skid signal generator 41a. In the other conduit system, the higher one of the wheel speed of the left front wheel 6b and the right rear wheel 11a is selected by the select-high circuit 39b for the select-high control. Thus the wheel speed of the left front wheel running on the high-$\mu$ side is selected and it is supplied to the skid signal generator 41b. The other operations are the same as those of the first embodiment. The control signals to the solenoid portions 30a, 30b of the change-over valves 4a, 4b are formed in the same manner as the first embodiment. Further, the advantages of this embodiment are the same as those of the first embodiment. The steering ability of the vehicle is secured and the brake distance can be shortened more than the prior arts.

Figure 5:
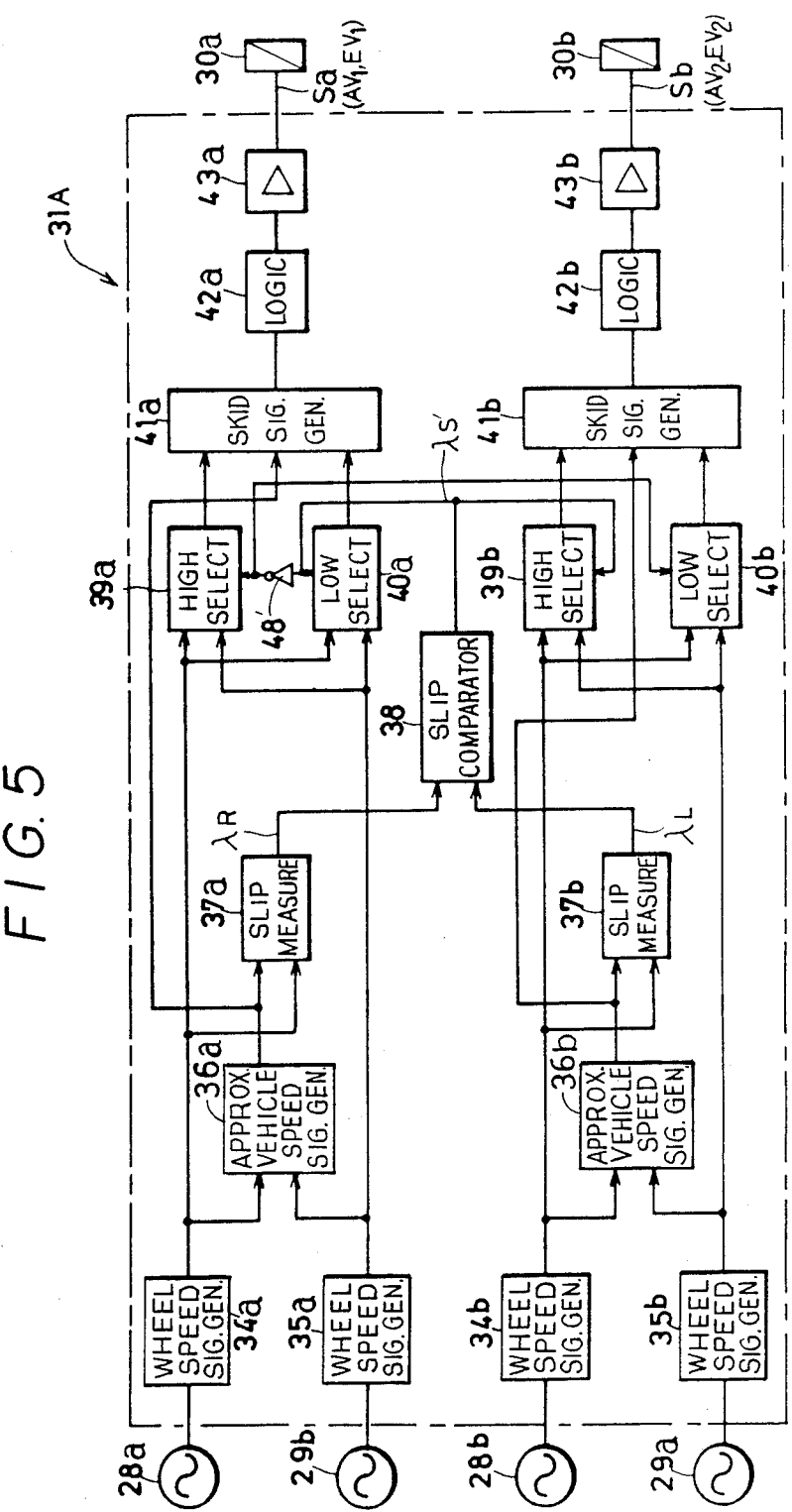
FIG. 5 is a circuit diagram of the control unit in an anti-skid control apparatus of a third embodiment of this invention.

FIG. 5 shows a control unit 31A according to the third embodiment of this invention. The parts in FIG. 5 which correspond to those in the above embodiment, are denoted by the same reference numerals, the descriptions of which will be omitted.

In FIG. 2, representing the first embodiment, the slip amounts of the rear wheels are calculated in the slip measuring circuits 37a, 37b and they are compared with each other in the comparator 38. However in the embodiment in FIG. 5, the wheel speeds of the front wheels, namely the outputs of the wheel speed signal generators 34a, 34b are supplied to slip measuring circuits 37a', 37b' and the slip amounts of the front wheels are calculated therein. They are compared with each other in the slip comparator 38. It generates an output $\lambda s'$. The output $\lambda s'$ is "1", when the slip amount of the right front wheel 6a or the output of the slip measuring circuits 37a' is larger than the amount of the other front wheel 6b or the output of the slip measuring circuit 37b'. And it is "0", when the former is smaller than the latter. In contrast to the first embodiment, the output $\lambda s'$ is supplied through a NOT gate 48' to a high-select circuit 39a and directly supplied to the low-select circuit 40a. In the other conduit sYstem, the output $\lambda s'$ is directly supplied to the high-select circuit 39b and supplied through the NOT gate 48' to the low-select circuit 40b.

Next, operations of this embodiment will be described. It is now assumed that the right side is low-$\mu$ side and the left side is high-$\mu$ side. Thus, the slip amount of the right front wheel or the output of the slip measuring circuit 38a' is larger than the output of the other slip measuring circuit 37b'. The output $\lambda s'$ of the slip comparator 38 becomes "1". It is supplied to the low-select circuit 40a. And in the other conduit system, it is supplied to the high-select circuit 39b. The conduit system of the rear wheel diagonally connected to the right front wheel 6a and the latter is controlled in the select-low manner, while the other conduit system to which the left front wheel 6b belongs, is controlled in the high-select manner. Also in this embodiment, both of the front wheels 6a, 6b are prevented from locking and so the steering ability of the vehicle can be secured and the brake distance can be shortened.

Figure 6:
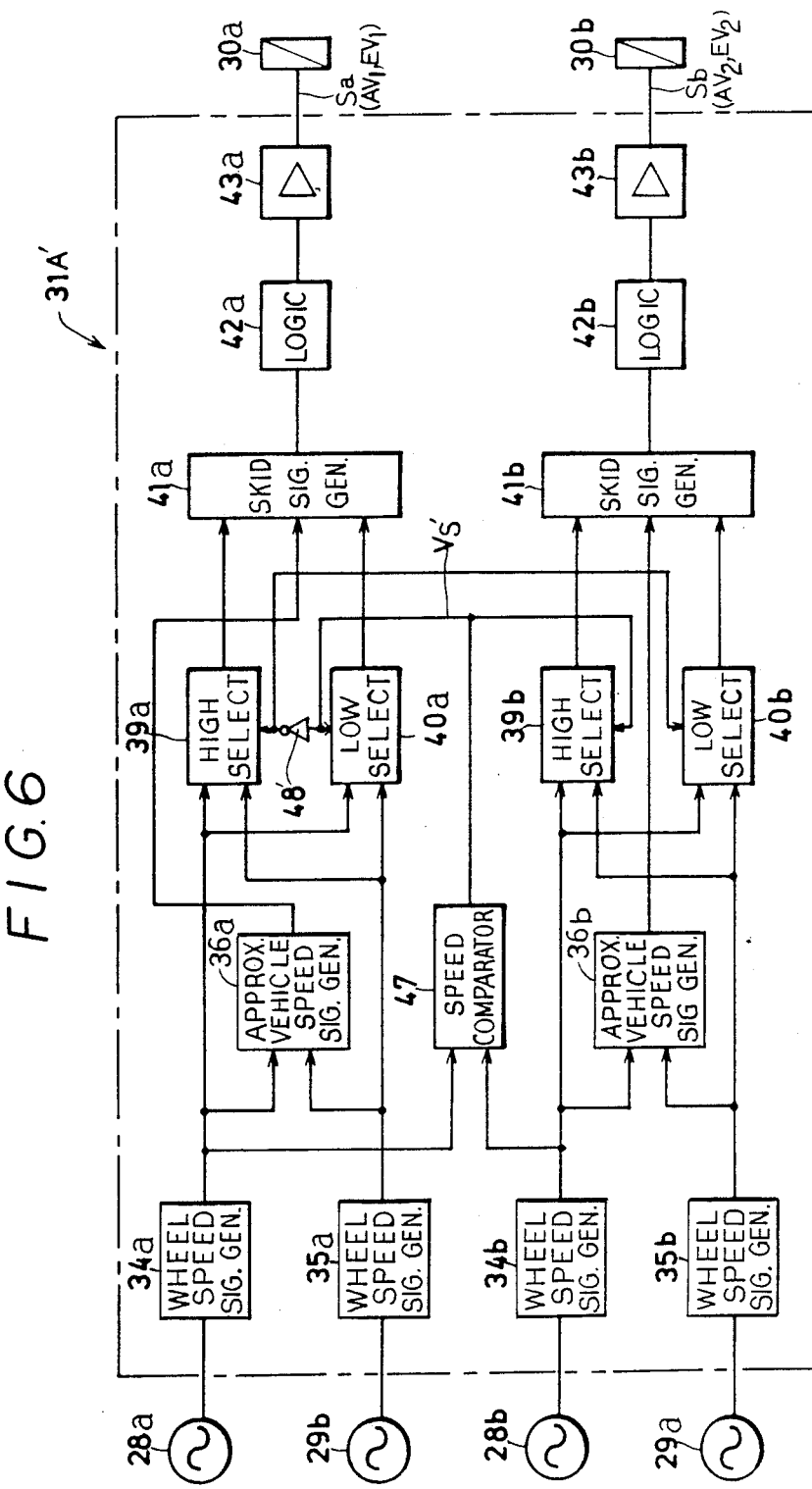
FIG. 6 is a circuit diagram of the control unit in an anti-skid control apparatus of a fourth embodiment of this invention.

FIG. 6 shows the fourth embodiment of this invention. Parts in FIG. 6 which correspond to those in the above embodiments are denoted by the same reference numerals, the description of which will be omitted. This embodiment is different from the above embodiments only in a control unit 31A'.

Figure 4:
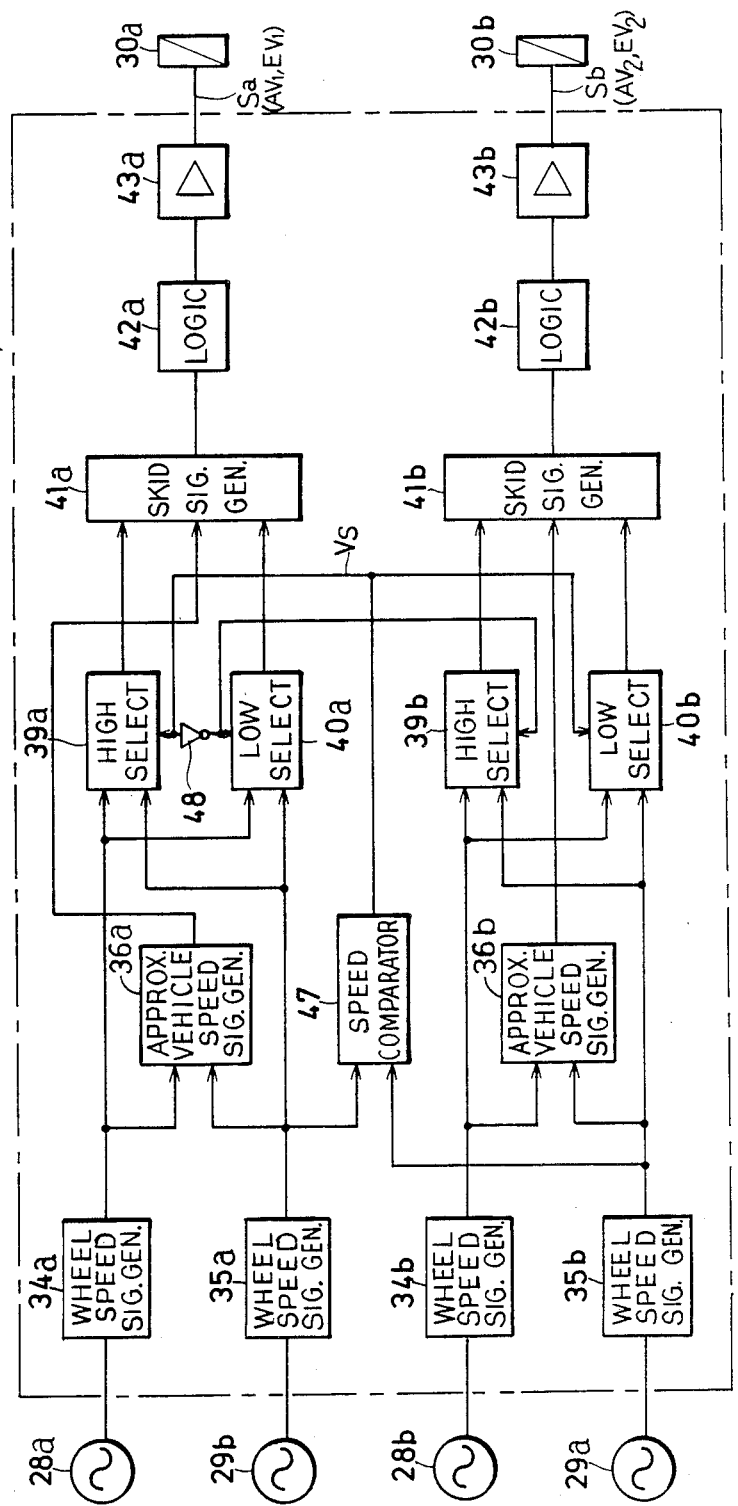
FIG. 4 is a circuit diagram of the control unit in an anti-skid control apparatus of a second embodiment of this invention.

In the second embodiment shown in FIG. 4, the wheel speed signals of the rear wheels are supplied to the speed comparator 47 from the wheel speed signal generators 35a, 35b to generate the output $\lambda s$. However, in this embodiment, the wheel speed signals of the front wheels are supplied to the speed comparator 47 from the wheel speed signal generators 34a, 34b. An output Vs' of the speed comparator 47 is supplied to the high-select circuit 39a and low-select circuit 40b through the NOT gate 48', and directly supplied to the low-select circuit 40a and high-select circuit 39b. As in the embodiment of FIG. 4, the output Vs' is "0", when the wheel speed of the right front wheel 6a is higher than that of the left front wheel 6b. And it is "1", when the former is lower than the latter.

As the above-embodiments, it is assumed that the right side is low-$\mu$, and the left side is high-$\mu$. The wheel speed of the front wheel 6b which is running on the high-$\mu$ side, is higher than that of the front wheel 6a which is running on the low-$\mu$ side. The output Vs' of the comparator 47 becomes "1". It is supplied to the low-select circuit 40a in the one conduit system, and it is supplied to the high-select circuit 39b in the other conduit system.

Thus, the conduit system of the front wheel 6a which is running on the low-$\mu$ side is controlled in the select-low manner, while the other conduit& system of the front wheel 6b which is running on the high-$\mu$ side, is controlled in the high-select manner. Thus, both of the front wheels 6a and 6b are prevented from locking. The steering stability of the vehicle can be secured, and the braking distance can be shorter.

Figure 8:
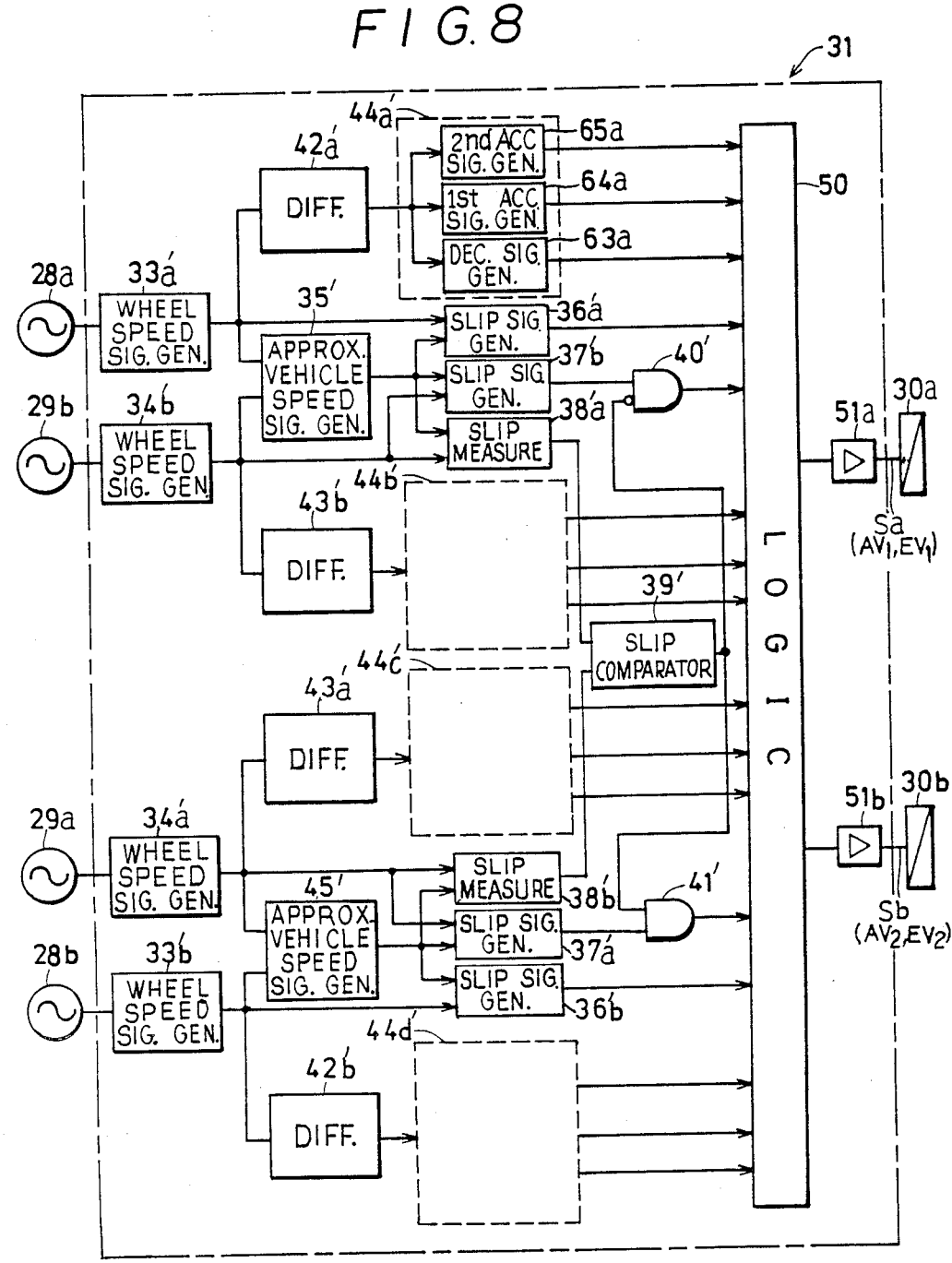
FIG. 8 is a circuit diagram of the control unit in an anti-skid control apparatus of a fifth embodiment of this invention.

FIG. 8 shows a control unit 31B in an anti-skid apparatus according to a fifth embodiment of this invention. The other parts of the apparatus are the same as the arrangement of FIG. 1.

The outputs of the wheel speed sensors 28a, 29b of the right front wheel 6b and left rear wheel 11b are supplied to wheel speed signal generators 33a' and 34b' in the one conduit system. Similarly, the outputs of the wheel speed sensors 29a and 28b of the left front wheel 6a and right rear wheel 11a are supplied to wheel speed signal generators 34a' and 33b' in the other conduit system. Outputs of the wheel speed signal generators 33a', 34b', 34a', 33b' are supplied to differentiators 42a', 43b', 43a' and 42b', respectively. Outputs of the differentiators 42a', 43b', 43a' and 42b' are supplied to acceleration-deceleration signal generating circuits 44a', 44b', 44c' and 44d'. They are equal to each other in construction. Accordingly, only the detail of the acceleration-deceleration signal generating circuit 44a' is representatively shown in FIG. 8.

The output of the differentiator 42a' is supplied to a deceleration signal generator 63a, and to first and second acceleration signal generators 64a and 65a. A predetermined threshold deceleration (for example, −1.4g) is set in the deceleration signal generator 63a, and it is compared with the output of the differentiator 42a'. Predetermined threshold accelerations (for example, 0.5g and 7g) are set in the first and second acceleration signal generators 64a and 65a respectively and they are compared with the output of the differentiator 42a'. When the deceleration of the wheel becomes larger than the predetermined threshold deceleration (−1.4g), a deceleration signal −b is generated from the deceleration signal generator 63a. When the acceleration of the wheel becomes larger than the predetermined threshold acceleration (0.5g) or (7g), an acceleration signal $+b_1$ or $+b_2$ is generated from the acceleration signal generator 64a or 65a.

The deceleration signal −b and the first and second acceleration signals $+b_1$, and $+b_2$ are supplied to a next stage logic circuit 50. The other acceleration-deceleration signal generating circuits 44b', 44c' and 44d' are constructed in the same manner as the acceleration-deceleration signal generating circuit 44a. The deceleration signals −b and the first and second acceleration signals $+b_1$, $+b_2$ from the acceleration-deceleration signal generating circuits 44b, 44c' and 44d' are supplied to the logic circuit 50, too.

The outputs of the wheel speed signal generators 33a and 34b for the one conduit system are supplied to an approximate vehicle speed signal generator 35' which is constructed in the well-known manner. An approximate vehicle speed signal is formed on the basis of the higher one of the outputs of the wheel speed signal generators 33a' and 34b' in the approximate vehicle speed signal generator 35'. It is supplied to slip signal generators 36a' and 37b'. Outputs of the wheel speed signal generators 33a', 34b' are supplied to other input terminals of the slip signal generators 36a', 37b'. Outputs of the slip signal generators 36a', 37b' are supplied to a logic circuit 50 and one input terminal of an AND gate 40', respectively The output of the approximate vehicle speed signal generator 35' is supplied to a slip measuring circuit 38a' which always generates present slip amounts. The output of the wheel speed signal generator 34b' which calculates the output of the wheel speed sensor 29b of the left rear wheel, is supplied to one input terminal of the slit measuring circuit 38a'.

A predetermined reference slip value is set in the slip signal generators 36a', 37b'. The output of the wheel speed signal generators 33a', 34b' are compared with the predetermined reference slip valve in the slip signal generators 36a', 37b' When the former becomes larger than the latter, a slip signal λ is generated.

Circuit arrangements for the other conduit system are similar to those for the one conduit system.

The outputs of the wheel speed signal generators 34a' and 33b' for the other conduit system are supplied to an approximate vehicle speed signal generator 45' which is constructed in the well-known manner. At approximate vehicle speed signal is formed on the basis of the higher one of the outputs of the wheel speed signal generators 34a' and 33b' in the approximate vehicle speed signal generator 45'. It is supplied to slip signal generators 37a' and 36b'. Outputs of the wheel speed signal generators 34a', 33b' are supplied to other input terminals of the slip signal generators 37a', 36b'. Outputs of the slip signal generators 36b', 37a' are supplied to the logic circuit 50 and one input terminal of an AND gate 41', respectively. The output of the approximate vehicle speed signal generator 45' is supplied to a slip measuring circuit 38b' which always generates present slip amounts. The output of the wheel speed signal generator 34a' which calculates the output of the wheel speed sensor 29a of the right rear wheel is supplied to one input terminal of the slip measuring circuit 38b'.

A predetermined reference slip value is set in the slip signal generators 37a', 36b'. The outputs of the wheel speed signal generators 34a', 33b' are compared with the predetermined reference slip value in the slip signal generators 37a', 36b'. When the former becomes larger than the latter, a slip signal λ is generated.

Outputs of the slip measuring circuits 38a', 38b' are supplied to a slip comparator 39'. Output of the slip comparator 39' is supplied to a negation input terminal of the AND gate 40 and to another input terminal of the AND gate 41'. The slip comparator 39' compared the outputs of the slip measuring circuits 38a', 38b'. When the slip amount of the left rear wheel or the output of the slip measuring circuit 38a' is larger than the slip amount of the right rear wheel or the output of the slip measuring circuit 38b, the output of the slip comparator 39' becomes "1". And when the former is smaller than the latter, it becomes "0". Thus, when the frictional coefficient μ of the left side of the road is smaller than that of the right side of the road, the output of the comparator 39' becomes "1", and so the output of the AND gate 40 is always "0". On the other hand, the output of the slip signal generator 37a' can pass through the AND gate 41.

Although the detail of the logic circuit 50 will be described hereinafter, outputs of the logic circuit 50 are amplified by amplifiers 51a and 51b. Thus, the above control signals Sa and Sb are obtained, and they are supplied to the solenoid portions 30a and 30b of the change-over valves 4a and 4b, respectively.

Next, detail of the logic circuit 50 will be described with reference to FIG. 9 and FIG. 10.

Figure 9:
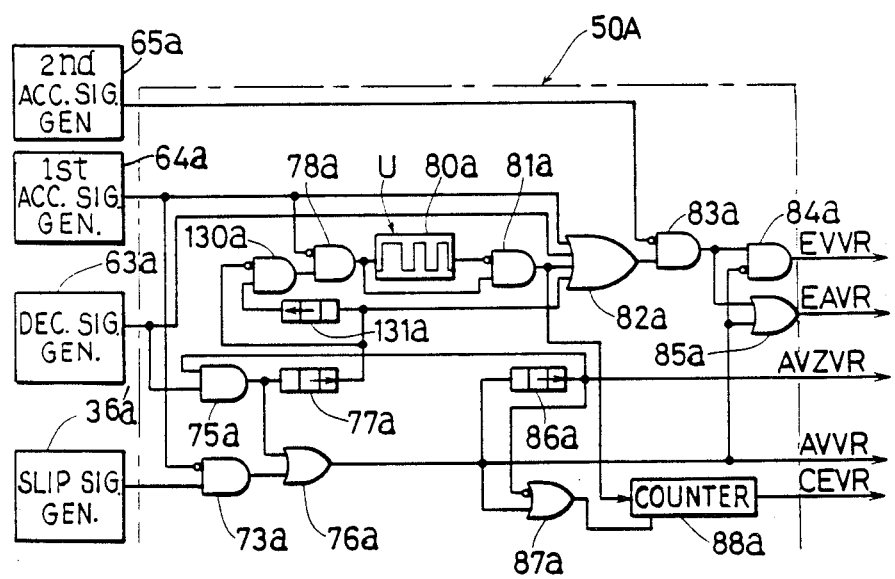
FIG. 9 is a circuit diagram of a part of a skid signal generating circuit in a logic circuit of FIG. 8.
Figure 10:
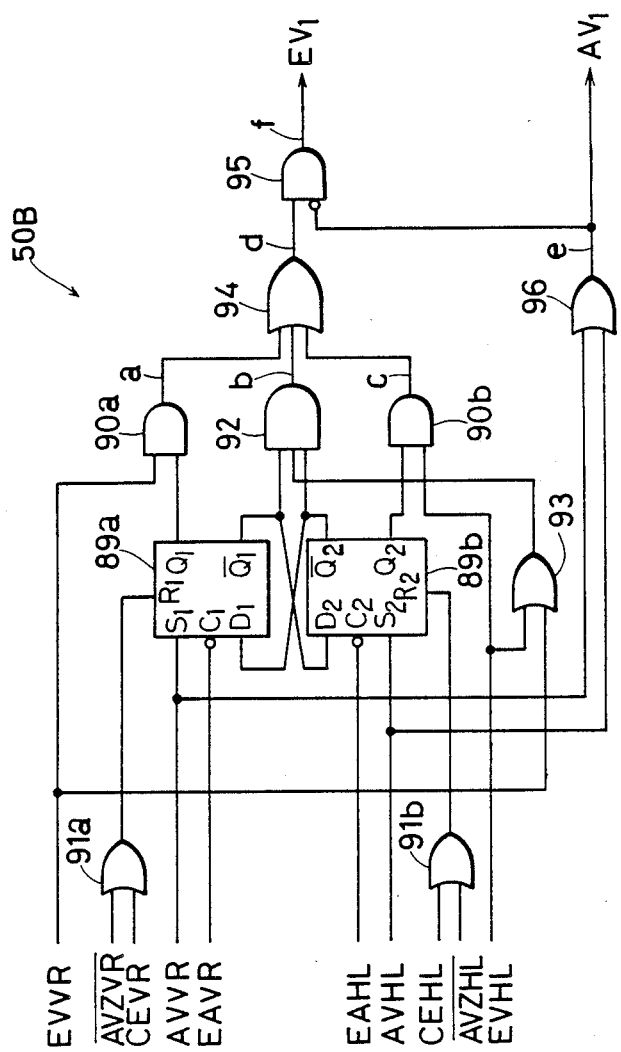
FIG. 10 is a circuit diagram of a part of a select-low circuit in the logic circuit.

The logic circuit 50 includes a skid signal generating circuit 50A shown in FIG. 9, a select-low circuit 50B shown in FIG. 10, and the motor drive circuit shown in FIG. 3.

FIG. 9 shows only the skid signal generating circuit for the right front wheel. However, the circuit arrangements of the skid signal generating circuits for the other wheels are the same as the circuit arrangement for the right front wheel. Accordingly, only the skid signal generating circuit 50A for the right front wheel will be representatively described hereinafter with reference to FIG. 9.

The select-low circuit 50B for the said signals of the right front wheel and left rear wheel is shown in FIG. 10. A select-low circuit for the said signals of the front and rear wheels of the other conduit system is constructed in the same manner as that shown in FIG. 10. Accordingly, only the select-low circuit 50B for the one conduit system will be representatively described with reference to FIG. 10.

First, the skid signal generating circuit 50A for the right front wheel will be described with reference to FIG. 9.

An output terminal of the first acceleration signal generator 64a in the former stage is connected to negation input terminals (indicated by circle O) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is constituted by the pulse generator 80a, the OR gate 82a, and the AND gate 81a, and it generates pulse signals to slowly increase the brake pressure. The width of the first pulse is so designed as to be larger than that of the following pulses in the pulse generator 80a. Thus, the insufficiency of the braking force is prevented.

The output terminal of the deceleration signal generator 63a' in the former stage is connected to a second input terminal of the OR gate 82a. The output terminal of the AND gate 81a is connected to the third input terminal of the OR gate 82a. The output terminal of the slip signal generator 36a', in the former stage is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a in the former stage is connected to one input terminal of the AND gate 75a and an output terminal of an OFF delay timer 86a is connected to another input terminal of the AND gate 75a. The delay time of the OFF delay timer 86a becomes "1", it is maintained during the anti-skid control operation. An output terminal of the OR gate 76a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal counter 88a. Pulses from the AND gate 81a are counted by the counter 88a. When the counted number reaches a predetermined number, the output of the counter 88a becomes "1". And when the output of the OR gate 87a becomes "1", the content of the counter 88a is reset.

The output terminal of the OR gate 82a is connected to one input terminal of an AND gate 83a, and the output terminal of the second acceleration signal generator 65a is connected to another negation input terminal. The output terminal of the AND gate 83a is connected to one input terminals of an AND gate 84a and OR gate 85a. The output terminal of the OR gate 76a is connected to another negation input terminal of the AND gate 84a and to another input terminal of the OR gate 85a.

The output terminal of the AND gate 75a is connected to an OFF delay timer 77a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The skid signal generating circuit for the right front wheel 6a is constructed as above described. Five kinds of signals are taken out from this circuit. They will be denominated as shown in the right end of FIG. 9. The output of the AND gate 84a as EVVR, those of the OR gates 85a and 76a as EAVR and AVVR, respectively, that of the OFF delay timer 86a as AVZVR, and that of the counter 88a as CEVR. The letter "V" means "front side", and the letter "R" means "right side".

The skid signal generating circuits for the left rear wheel 11b, the left front wheel 6b and the right rear wheel 11a are constructed in the similar manner respectively. The five kinds of signals EVHL, EAHL, AVZHL, AVHL, CEHL are taken out from the skid signal generating circuit for the left rear wheel 11b, where the letter "H" means "rear side" and the letter "L" means "left side". Similarly EVVL, EAVL, AVZVL, AVVL, CEVL and EVHR, EAHR, AVZHR, AVHR, CEHR, PLHR, are taken out from the skid signal generation for the left front wheel 6b and the right rear wheel 11a, respectively.

Next, the details of the select-low circuit 50B of the logic circuit 50 will be described with reference to FIG. 10.

The select-low circuit 50B is constructed symmetrically with respect to the front and rear wheels 6a and 11b, diagonally connected to each other. The output signals EVVR, EVHL, $\overline{AVZVR}$, $\overline{AVZHL}$ (negations of the AVZVR, AVZHL, respectively), CEVR, CEHL, AVVR, AvHL, EAVR and EAHL from the skid signal generating circuit 50A are supplied to the select-low circuit 50B. The output signals EVVR and EVHL are supplied to one input terminals of AND gates 90a and 90b, respectively and input terminals of an OR gate 93. The output signals $\overline{AVZVR}$ and $\overline{AVZHL}$ are supplied to one input terminals of OR gate 91a and 91b, respectively. The output signals CEVR and CEHL are supplied to other input terminals of the OR gates 51a and 51b. Output terminals of the OR gates 91a and 91b are connected to reset terminals R1 and R2 of flip-flops 89a and 89b, respectively.

The flip-flops 89a and 89b are of the D-type. The output signals AVVR and AVHL are supplied to set terminals S1, S2 of the flip flops 89a and 89b, and they are further supplied to an OR gate 96.

The output signals EAVR and EAHL are negated, and then supplied to clock terminals C1, C2 of the flip-flops 89a, 89b. Output terminals Q1, Q2 of the flip-flops 89a, 89b are connected to other input terminals of the AND gate 90a, 90b. Negation output terminals $\overline{Q_1}$, $\overline{Q_2}$ are connected to data terminals D2 and D1 of other flip-flops 89b and 89a, and further they are connected to input terminals of an AND gate 92. An output terminal of the OR gate 93 is connected to the remaining one input terminal of the AND gate 92. Output terminals of the AND gates 90a, 90b, 92 are connected to input terminals of an OR gate 94, respectively. An output terminal of the OR gate 94 is connected to one input terminal of an AND gate 95. An output terminal of the OR gate 96 is connected to another negation input terminal of the AND gate 95. Outputs f and e of the AND gate 95 and OR gate 96 are the signals EV1 and AV1 which constitute the control signal Sa. The current levels of the signals EV1 and AV1 are "½" and "1", respectively.

The select-low circuit for the skid signals of the front and rear wheels of the other conduit system is constructed in the same manner as the circuit shown in FIG. 10, and it generates the signals EV2 and AV2 which constitutes the control signal Sb. The current levels of the signals EV2 and AV2 are "½" and "1" respectively.

Next, there will be described operations of the above described anti-skid apparatus, with reference to FIG. 8 to FIG. 11 and FIG. 1.

It is now assumed that the wheels 6a, 6b, 11a and 11b run on the road which is uniform in frictional coefficient.

The vehicle driver treads the brake pedal 2. At the beginning of the braking, the control signals Sa and Sb are "0" from the control unit 31B. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valves devices 4a, 4b and the conduits 5, 17. Further, it is supplied to the wheel cylinders 12a and 12b of the rear wheels 11a and 11b through the conduits 13 and 15 and the proportioning valves 32a and 32b. Thus, the wheels 6a, 6b, 11a and 11b are braked.

When the deceleration or slip ratio of the wheels 6a, 6b, 11a and 11b becomes higher than the predetermined deceleration or slip ratio with the increase of the brake fluid pressure, the control signals Sa and Sb become high level "1" or middle level "½". The solenoid portions 30a and 30b are energized.

Although operations of the control unit 31B according to this embodiment will be described hereinafter, first operations of the valve apparatus will be described at the control signals Sa, Sb="1" and "½".

When the control signals Sa, Sb becomes "1", the valves 4a and 4b take the third position C. The conduits 3 and 16 are interrupted from the conduits 5 and 17, respectively. However, the conduits 5 and 17 are connected to the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, and the conduits 17, 5, 60b and 60a, into the hydraulic reservoirs 25a and 25b. Thus, the brakes of the wheels 6a, 6b, 11a and 11b are relieved.

When the control signals Sa and Sb b[come middle level "½", the valves 4a and 4b take the second position B. The conduits 3, 16 are interrupted from the conduits 5, 17. Further, the conduits 5, 17 are interrupted from the conduits 60a, 60b. Thus the brake fluid pressure of the wheel cylinders 7a, 7b, 12a and 12b are maintained at constant. The fluid pressure pumps 20a and 20b continue to supply brake fluid towards the conduits 3 and 16.

When the skid conditions cf the wheels 6a, 6b, 11a and 11b are removed, the control signals Sa and Sb become again low level "0". The valves 4a and 4b take the position A. The master cylinder side is connected to wheel cylinder side. The braking forces to the wheels 6a, 6b, 11a and 11b again increases.

Hereinafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits 4a, 4b, the check valves 19a and 19b. Thus, the brake is relieved.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations at the beginning of the braking are the same as above described. When the control signal Sa becomes "1", the valve 4a takes the position C. pressurized fluid is discharged into the reservoir 25a from the wheel cylinders 7a and 12b.

On the other hand, the brake fluid continues to be supplied to the wheel cylinders 7b and 12a from the master cylinder 1.

When the control signal Sa becomes "½", the fluid pressures of the wheel cylinders 7a and 12b of the front and rear wheels 6a and 11b are maintained at constant. And when the other control signal Sb is still "0", the fluid pressures of the wheel cylinder 7b of the other front wheel 6b continues to rise.

Next, operations of the control unit 31B according to this embodiment will be described.

It is now assumed that the frictional coefficient of the right side is smaller (low side). The brake pedal 2 is trodden. At time t1, the right front wheel 6a reaches the predetermined deceleration, and so the signal −b is generated from the deceleration signal generator 63a in the acceleration-deceleration signal generating circuit 44a for the right from wheel 6a. The signal −b is supplied to the third input terminal of the OR gate 82a. The output of the OR gate 82a generates the output signal EVVR through the AND gates 83a and 84a, and further the output signal EAVR through the OR gate 85a.

Figure 11:
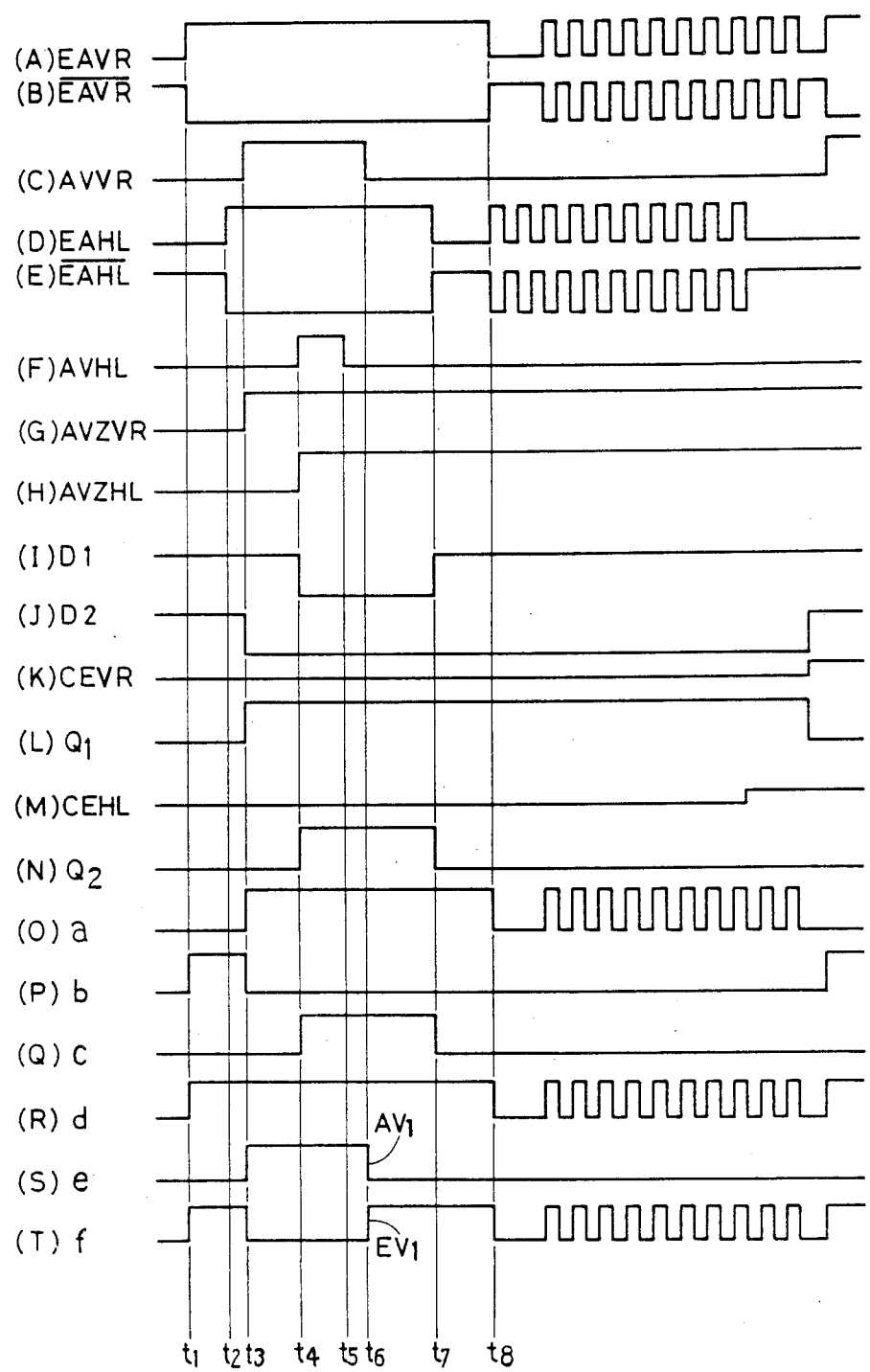
FIG. 11 is time charts of the respective signals for i explaining operations of the fifth embodiments.

As shown in FIG. 11(A), the signal EAVR becomes "1" at time t1. In FIG. 10, the $Q_1$, $Q_2$ outputs of the flip-flops 89a, 89b are "1", and the signal EVVR is low supplied to the AND gate 92. Accordingly, the output b of the AND gate 92 becomes "1", and so both of the outputs d and f of the OR gate 94 and AND gate 95 become "1". Thus the signal EV1 becomes "1". Thus, at time t1, the outputs b, d and f becomes "1", as shown in FIG. 11 P.R.T. accordingly, the control signal Sa of the current level "½" is supplied to the solenoid portion 30a of the change-over valve 4a. Thus, the braking forces to the right front wheel 6a and rear wheel 11b are maintained at constant.

At time t2, the rear wheel 11b on the "high side" of the road reaches the predetermined deceleration. The signal EVHL, therefore, EAHL is generated, as shown in FIG. 11 (D). It is supplied to the other input terminal of the OR gate 93. The signal EVVR is already supplied to the other input terminal of the OR gate 93. Since it is maintained, the output of the OR gate 93, therefore, that b of the AND gate 92, that d of the OR gate 94, and the output signal EV1 are unchanged as "1", as shown in FIG. 11 (P)R)(T).

At time t3, the right front wheel 6a generates the signal AVVR as shown in FIG. 11(C). It reaches the predetermined slip. The slip signal λ is generated from the slip signal generator 36a'. It is supplied to the one input terminal of the AND gate 73a. Since the first acceleration signal $+b_1$ are not generated, the output of the AND gate 73a becomes "1". Thus, the signal AVVR is generated. At the same time, the output of the AND gate 84a or signal EVVR becomes "0". However, the output of the OR gate 85a or the signal EAVR continues to be "1", as shown in FIG. 11(A).

In FIG. 9, the slip signal is supplied to the OFF delay timer 86a. The output of the OFF delay timer 86a is supplied to the one input terminal of the AND gate 75a. Accordingly, hereinafter when the deceleration signal is generated, the output of the AND gate 75a, therefore that of the OR gate 76a becomes "1". Thus the signal AVVR is generated. The output of the OR gate 76a is supplied to the OFF delay timer 86a. Accordingly, the signal AVZVR is generated as shown in FIG. 11. In FIG. 3, the motor drive signal Qo is generated from the amplifier 46. The motor 22 starts to be driven in FIG. 1.

In FIG. 10, the signal AVVR is supplied to the set terminal $S_1$ of the flip-flop 89a. The Q1 output thereof becomes "1". The $\overline{Q1}$ output thereof becomes "0". Accordingly, the input to the data terminal D2 of the other flip-flop 89b, becomes "0", as shown in FIG. 11. The output of the OR gate 96, therefore the signal AV is generated as shown in FIG. 11S. The signal EV becomes "0". Thus, the control signal Sa of the current level "1" is supplied to the solenoid portion 30a of the change-over valve 4a in FIG. 1. Thus, the brakes of the right front wheel 6a and rear wheel 11b are relieved.

At time t4, the other rear wheel 11b reaches the predetermined slip during the continuation of the signal AVVR as shown in FIG. 11C. Thus, the signal AVHL is generated as shown in FIG. 11F. In FIG. 10, it is supplied to the set terminal S2 of the flip-flop 89b. Accordingly, the Q2 output thereof becomes "1" and the $\overline{Q2}$ output thereof becomes "0". Thus, the input to the data terminal D1 of the flip-flop 89a becomes "0" as shown in FIG. 11.

The signal AVHL is supplied to the one input terminal of the OR gate 96, too. Since the signal AVVR continues to be supplied to the other input terminal on the OR gate 96, the signal AV remains "1".

At time t5, the signal AVVL becomes 37 0". However, it has no influence on the other signals.

At time t6, the slip signal λ of the right front wheel 6a disappears. Accordingly, the signal AVVR becomes "0" as shown in FIG. 11C. In FIG. 9, the input to the one input terminal of the OR gate 85a becomes "0". However, after the signal −b disappears, the output of the OR gate 82a is still "1" because of the delay time cf the OFF delay timer 77a. Accordingly, the output of the AND gate 84a, therefore the signal EVVR becomes again "1" with the disappearance of the signal AVVR. The output of the OR gate 85a, therefore the signal EAVR continues to be "1" as shown in FIG. 11A.

In FIG. 9, the signal AVVR becomes "0". However, since the output of the OR gate 91a is still "0", the flip-flop 89a is not reset, but the Q output thereof remains "1" as shown in FIG. 11L. The signal EVVR is still "1". Accordingly, the output a of the AND gate 90a remains "1", as shown FIG. 11O. The output e of the OR gate 96 becomes "0". Accordingly, the output f of the AND gate 95, therefore the signal EV1 becomes again "1" from "0" as shown in FIG. 11T.

In FIG. 1, the change-over valve 4a is changed over to the position B, and the braking forces to the right front wheel 6a and the rear wheel 11b. are maintained at constant.

In FIG. 9 when the deceleration signal −b disappears, and the delay time of the OFF delay timer 77a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 11D, as long as the first acceleration signal $+b_1$ is generated, although the output of the OFF delay timer 77a becomes "0". At time t7 when the first acceleration signal $+b_1$ disappears, the signal EAHL becomes "0".

In FIG. 10, the input to the clock terminal C2 of the flip-flop 89b becomes "0". It is inverted or negated and supplied to the clock terminal C2. The input "0" is supplied to the data terminal D2, and it is read out with the negated input to the clock terminal C. Thus, the Q2 output becomes "0" as shown in FIG. 11N. Accordingly, the Q2 output becomes "1". The Q1 output of the other flip-flop 89a remains "0". Accordingly, the output b of the AND gate 92 remains "0". The output c of the AND gate 90b becomes "0" with the disappearance of the Q2 output of the flip-flop 89b, as shown in FIG. 11Q.

On the other hand, the Q1 output of the flip-flop 89a remains "1", and the right front wheel 6a still generates the signal EVVR. Accordingly, the output a of the AND gate 90a continues to be "1", and the signal EV1 remains "1" as shown in FIG. 11T.

In FIG. 9, as soon as the first acceleration signal +b1 disappears, the pulse generator 80a is driven for the delay time of the OFF delay timer 131a. The signal EAHL, and $\overline{EAHL}$ are changed pulselikely as "1", "0", "1", "0", ....., as shown in FIG. 11D, from time t8. In FIG. 10, the one input to the OR gate 93 and the one input to the AND gate 90b are changed pulse-likely. However, the Q2 output of the one flip-flop 89b is "0", and the $\overline{Q1}$ output of the other flip-flop 89a is "0". Accordingly, the output EV1 of the AND gate 95 is not changed pulse-likely, but it continues to be "1" with the signal EVVR. Accordingly, the braking forces to the right front wheel 6a and the rear wheels 11b are still maintained at constant.

When the right front wheel 6b generates the first acceleration signal +b1 after time t7, the signal EVVR and EAVR continue to be "1 " although the delay time of the OFF delay timer 77a. The braking forces to the right front wheel 6a and rear wheel 11b are still maintained at constant. However, at time t8 when the first acceleration signal +b1 disappears, the pulse generator 80a is driven, and the signal EAVR is changed pulse-likely as shown in FIG. 11A. Thus, the signal EV1 is pulse-likely changed.

The braking force to the right front wheel 6a and rear wheels 11b are stepwisely increased.

When the counted pulses reach the predetermined value, the output CEVR of the counter 88a (in FIG. 9) in the skid signal generating circuit 50A for the right front wheel 6a becomes "1". Accordingly, in FIG. 10, the input of the one input terminal of the OR gate 91a becomes "1". The output of the OR gate 91a becomes "1". The flip-flop 89a is reset. The Q, output thereof becomes "0". Thus, although the pulse-like output continues, the stepwise braking operation is stopped, and then the braking force is rapidly increased.

For facilitating the understanding, there has been described only the braking force control of the front and rear wheels 6a, 11b of the one conduit system. Actually the braking force control is effected for the other conduit system of the front and rear wheel 6b and 11a during the braking force control of the ore conduit system.

Next, there will be described the braking force control of the front and rear wheels 6a 11a of the other conduit system during the braking force control of the one conduit system.

As above described, the frictional coefficient of the right side of the road is smaller than that of the left side of the road. The brake pedal 2 is trodden. A time t1' when the right rear wheel 11a reaches the predetermined deceleration, the deceleration signal —b is generated from the deceleration signal generator in the acceleration-deceleration signal generating circuit 44c which corresponds to the deceleration signal generator 63a in the acceleration-deceleration signal generating circuit 44a. In FIG. 8, only the acceleration-deceleration signal generating circuit 44a for the right front wheel 6a is shown in detail. Hereinafter for the convenience of the description, the same reference numerals are used for the corresponding parts in the acceleration-deceleration signal generating circuits 44b, 44c and 44d for the other wheels.

Further, in FIG. 9, only the skid signal generating circuit for the right front wheel 6a is shown in detail. Hereinafter for the convenience of the description, the same reference numerals are used for the corresponding parts in the skid signal generating circuits for the other wheels.

The signal —b of the right rear wheel 11a is supplied to the OR gate 82a. The outputs EVHR and EAHR are generated from the skid signal generating circuit 50A for the right rear wheel 11a. They are supplied to the next stage select-low circuit 50B. Only the select-low circuit for the one conduit system is shown in FIG. 10. Since constructed in the same manner, the same reference numerals are used for the corresponding parts in the select-low circuit for the other conduit system. Further, "VR" and "HL" are substituted with "VL" and "HR", respectively in FIG. 10, for the other conduit system.

The signal EAHR becomes "1" at time t1'. In FIG. 10, the $Q_1$, $Q_2$ outputs of the flip-flops 89a, 89b are "1", and the signal EVHR is now supplied to the AND gate 92. Accordingly, the output b of the AND gate 92 becomes "1", and so both of the outputs d and f of he OR gate 94 and AND gate 95 become "1". Thus, the signal EV2 becomes "1". Thus, at time t1', the outputs b, d and f becomes "1". Accordingly,the control signal Sb of the current level "½" is supplied to the solenoid portion 30b of the change-over valve 4b. Thus, the braking forces to the left front wheel 6b and rear wheel 11a are maintained at constant.

At time t2', the front wheel 6b on the "high side" of the road reaches the predetermined deceleration. The signal EVVL, therefore, EAVL is generated. It is supplied to the other input terminal of the OR gate 93. The signal EVHR is already supplied to the other input terminal of the OR gate 93. Since it is maintained, the output of the OR gate 93, therefore, that b of the AND gate 92, that d of the OR gate 94, and the output signal EV2 are unchanged as "1".

At time t3', the right rear wheel 11a generates the signal AVHR, since it reaches the predetermined slip. The slip signal λ is generated from the slip signal generator 37a. It is supplied to the one input terminal of the AND gate 41.

During the running of the vehicle, the slip measuring circuits 38a', 38b' always generate the present slip amounts of the rear wheels 11a, 11b, which are supplied to the slip comparator 39', and compared with each other thereby. Now the right side of the road is low-μ side. Accordingly, the output of the comparator 39' is "0", and it is supplied to the one input terminal of the AND gate 41'. The slip signal λHR from the slip signal generator 37a' cannot pass through the AND gate 41'. Accordingly, the output AVHR is not generated from the skid signal generating circuit 50A for the right rear wheel 11a, which was generated in the prior art. Since the signal EVHR continues still, the braking force of the conduit system of the right rear wheel 11a remains maintained at constant.

In the one conduit system, when the other rear wheel 11b reaches the predetermined slip, the slip signal λ is generated from the slip signal generator 37b' in FIG. 8, and it is supplied to the one input terminal of the AND gate 40'. Since the input "0" is supplied to the negation input terminal the AND gate 40', the output thereof becomes "1", and it is supplied to the next stage skid signal generating circuit 50A. As above described, the output AVHR is not generated, although the rear wheel 11a on the low-μ side generates the slip signal λ. Accordingly, the output AVHR is not supplied to the set terminal S2 of the flip flop 89b. The Q2 and Q2 outputs thereof don't change.

When the left front wheel 6b reaches the predetermined slip at time t4', the signal AVVL is generated, and it is supplied to the set terminal S1 of the flip-flop 89a. The Q1 output thereof becomes "1", while the Q1 output thereof becomes "0". Accordingly, the input to the data terminal D2 of the flip-flop 89b becomes "0".

The signal AVVL is supplied to the one input terminal of the OR gate 96. Thus, the signal AV2 is generated. The braking forces of the front and rear wheels 6b and 11a are decreased.

At time t5, the slip signal λ of the left front wheel 6b disappears. Accordingly, the signal AVVL becomes "0". In FIG. 9, the input to the one input terminal of the OR gate 85a becomes "0". However, after the signal —b disappears, the output of the OR gate 82a is still "1" because of the delay time of the OFF delay timer 77a. Accordingly, the output of the AND gate 84a, therefore the signal EVVL becomes again "1" with the disappearance of the signal AVVL. The output of the OR gate 85a, therefore the signal EAVL continues to be "1".

In FIG. 9, the signal AVVL, becomes "0". However, since the output of the OR gate 91a is still "0", the flip-flop 89a is not reset, but the Q output thereof remains "1". The signal EVVL is still "1". Accordingly, the output a of the AND gate 90a remains "1". The output e of the OR gate 96 becomes "0". Accordingly, the output f of the AND gate 95, therefore the signal EV2 becomes again "1" from "0". In FIG. 1, the change-over valve 4b is changed over to the position B, and the braking forces to the right front wheel 6b and the rear wheel 11a are maintained at constant.

In FIG. 9 when the deceleration signal —b disappears, and the delay time of the OFF delay timer 77a lapses, the input to the fourth input terminal of the OR gate 82a becomes "0". However, it is assumed that the left front wheel 6b reaches the predetermined first acceleration before the lapse of the delay time of the OFF delay timer 77a. Accordingly, the input to the first input terminal of the OR gate 82a becomes "1", and the signal EAVL continues to be "1" as long as the first acceleration signal $+b_1$ is generated, although the output of the OFF delay timer 77a becomes "0". At time t6' when the first acceleration signal $+b_1$ disappears, the signal EAVL becomes "0".

In FIG. 9, as soon as the first acceleration signal $+b_1$ disappears, the pulse generator 80a is driven for the delay time of the OFF delay timer 131a. The signal EAVL, and $\overline{EAVL}$ are changed pulse-likely as "1", "0", "1", "0", ...... In FIG. 10, the one input to the OR gate 93 and the one input to the AND gate 90b are changed pulse-likely. However, the Q2 output of the one flip-flop 89b is "0", and the $\overline{Q1}$ output of the other flip-flop 89a is "0". Accordingly, the output EV2 of the AND gate 95 is not changed pulse-likely, but it continues to "1" with the signal EVHR. Accordingly, the braking forces to the right front wheel 6b and rear wheels 11a are still maintained at constant.

However, when the signal EVHR is not generated, the output EV2 changes pulse-likely. The braking forces of the left front wheel 6b and right rear wheel 11a are stepwisely increased.

Although there have been described the operations of the fifth embodiment, the advantages thereof are as follows:

The skid condition of the one rear wheel running on the side of the road on which the traking frictional co-efficient is higher is judged by its acceleration condition and slip condition, while the other rear wheel running on the other side of the road on which the braking frictional co-efficient is lower, is judged only by its acceleration condition. Further, the rear wheel and the front wheel diagonally to the rear wheel in the same conduit system, are controlled in the select-low manner. Accordingly, the steering stability is maintained and the braking distance can be shortened more.

In more detail, when the deceleration signal $-b$ is generated from the one rear wheel running on the low-$\mu$ side, the braking force is maintained at constant. Accordingly, the one rear wheel is prevented from suddenly locking. Thus, the driver can make the vehicle stable by the handling operation. As above described, the brake of the one rear wheel running on the low-$\mu$ side is maintained at constant, but is not relieved. Accordingly the brake of the front wheel on the high-$\mu$ side, diagonally connected to the one rear wheel is maintained at constant, but the braking force thereof is not unnecessarily decreased. When the one rear wheel on the low-$\mu$ side lacks, the deceleration signal thereof $-b$ disappears and then the front wheel on the high-$\mu$ side diagonally connected to the one rear wheel is controlled by the control signal of itself on the high-$\mu$ side. Thus, even when the one rear wheel on the low-$\mu$ side slips much, the braking force of the front wheel on the high-$\mu$ side is not decreased by the slip signal of it as the prior art. Thus, the braking force of the front wheel is not unnecessarily decreased.

When the first acceleration signal $+b$, is generated from the one rear wheel on the low-$\mu$ side, the braking force of it is not increased but it is maintained at constant. Accordingly the one rear wheel is avoided from locking at once.

When the second acceleration signal $+b_2$ is generated from the one rear wheel, the braking force is increased and so the braking insufficiency can be avoided.

While the preferred embodiments have been described, variations thereto will occur to those skilled in the art within the scope of present inventive concepts which are delineated by the following claims.

For example, in the first to fourth embodiments, the slip amounts or wheel speeds of the front wheels both or rear wheels both are compared with each other in order to judge the lower one of the frictional coefficients of the sides of the road. Instead, the one side of the road on which the one of the front wheels both or rear wheels both having lower lock pressure is running, may be "low-$\mu$ side". Or the one side of the road on which the one of them generating sooner the control signal (AV$_1$, AV$_2$ or EV$_1$, EV$_2$) is running, may be "low-$\mu$ side". The select-low control and select-high control are effected in the same manner as above described.

Figure 7:
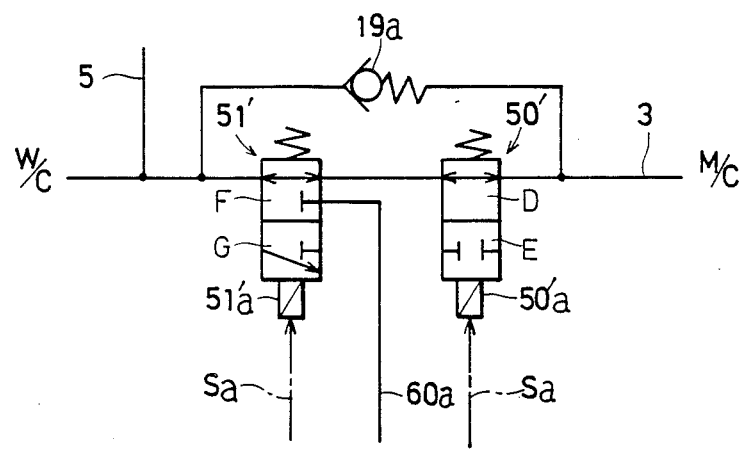
FIG. 7 is a conduit system of one modification of a change-over valve in FIG. 1.

In FIG. 1, the three-position, three-port electromagnetic change-over valves 4a, 4b are used Instead, a valve apparatus as shown in FIG. 7 may be used. It consists of an inlet valve 50 and an outlet valve 51. In FIG. 7, only the valve apparatus for the change-over valve 4a is shown. However, a valve apparatus similar to that shown in FIG. 7 is used for the change-over valve 4b. The inlet valve 50' is a two-position, two port electromagnetic change-over valve and the outlet valve 51' is a two-position, three-port electromagnetic change-over valve. The control signals Sa1 and Sa2 are supplied to their solenoid portions 50'a, 51'a from a not-shown control unit. The control signals Sa1 and Sa2 take two current levels "0" and "1". When the current level is "0", the valves 50', 51' take positions D and F respectively. In the positions D and F, the master cylinder (M/C) side and the wheel cylinder (W/C) side communicate with each other. When the control signals Sa1 and Sa2 are level "1", the valves 50', 51' take the positions E and G respectively. The inlet valve 50' is put into the cut-off state, and in the outlet valve 51', the master cylinder side and the wheel cylinder side are interrupted from each other, but the wheel cylinder side and reserver side are made to communicate with each other through the conduit 60a. When the valve apparatus shown in FIG. 7 is used, it is clear that the same effects as in the above embodiments can be obtained.

Further, in the above embodiments, the slip amounts of the rear wheels both or the front wheels both are compared with each other. Instead, the slip ratios of them may be compared with each other.

Further in the above embodiments, the slip or the wheel speeds of rear wheels both or front wheels both are compared with each other, and nothing is mentioned about the case that they are equal to each other. In that time, anyone of the select-low control and select-high control may be effected.

Further in the above embodiments, the higher one of the wheel speeds of the front and rear wheels of the same conduit system is selected to form the approximate vehicle speed signal, and the latter is formed in accordance with the change of the higher one of the wheel speeds. Instead, the highest one of the wheels all may be selected to form the approximate vehicle speed. Or not on the basis of the wheel speed, the approximate vehicle speed may be calculated from output of a vehicle deceleration sensor, or in use of the Doppler effect.

In the above embodiments, the case has been described that the right side of road is low-$\mu$ side and left side of the road is high-$\mu$ side. Of course, this invention may be applied to the case that the right side of the road is high-$\mu$ side and the left side of the road is low-$\mu$ side.

Further, when the vehicle removes from the split road in which the right side is low-μ side and left side is high-μ side, into the other split road in which the right side is high-μ side and the left side is low-μ side, of course, the select high control and low select control are exchanged between the two conduit systems.

Further in the fifth embodiment, the one side of the road on which the one of the rear wheels having the lower wheel speed is running, may be frictionally lower side and the other side of the road on which the other of the rear wheels having the higher wheel speed is running, may be frictionally high side. Or the one side of the road on which the one of the rear wheels having smaller braking force is running, may be frictionally low side and the other side of the road on which the other of the rear wheels having the larger braking force is running, may be frictionally high side. Or the one side of the road on which the one of the rear wheel having lower lock pressure is running, may be frictionally low side and the other side of the road on which the other of the rear wheels having higher lock pressure is running, may be frictionally high side. Further, in that case, it is preferable that the judgement on the frictional co-efficients of the road may be reset or inverted. In other words, the judgement on the frictional coefficients is not maintained during the anti-skid control, but it may be changed under a predetermined condition.

Further in the fifth embodiment, the deceleration signal and the acceleration signal are used to control the brake fluid pressure of the one rear wheel on the low-μ side. Instead, only the deceleration signal may be used as a control signal for the rear wheel on low-μ side.

Further in the fifth embodiment, when the rear wheel on the low-μ side generates the first acceleration signal, the skid signal for maintaining the brake at constant is generated as in the other wheels all and when the first acceleration signal disappears, the stepwise braking force is not imparted to the rear wheel on the low-μ side while the skid signal for increasing stepwise the braking force is generated for the other wheels. And the brake of the rear wheel running on the low-μ side is rapidly increased. Instead when the first acceleration signal disappears, the skid signal for increasing the brake stepwisely may be generated for the rear wheel or the low-μ side as in the other wheels all.

In the fifth embodiment, when the one rear wheel on the high-μ side and the front wheels both generate the initial deceleration signal before the slip signal is generated, the braking forces for them are maintained at constant and after the slip signal is generated, the braking force for them are decreased with the generation of the deceleration signal. Instead, also when the initial deceleration signal is generated from the one rear wheel on the low-μ side before the slip signal is generated, the braking force is maintained and after the slip signal is generated, also the braking force for the one rear wheel on the low-μ side may be decreased with the generation of the deceleration signal. Or when the one rear wheel on the low-μ side generates initially the deceleration signal, the braking force for it is not maintained at constant, but it may be decreased.

What is claimed is:

1. In an anti-skid control apparatus for a vehicle braking system including:

(A) a pair of front wheels and a pair of rear wheels which are diagonally connected with each other;

(B) wheel speed sensors associated with said wheels, respectively;

(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;

(D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit comprising a right front wheel speed signal generator (34a) connected to a one of the wheel speed sensors (28a) associated with a right one of the pair of front wheels (6a) to produce a first wheel speed signal;

a left rear wheel speed signal generator (35a) connected to a one of the wheel speed sensors (29b) associated with a left one of the pair of rear wheels (11b) to produce a second wheel speed signal;

a left front wheel speed signal generator (34b) connected to a one of the wheel speed sensors (28b) associated with a left one of the pair of front wheels (6b) to produce a third wheel speed signal;

a right rear wheel speed signal generator (35b) connected to a one of the wheel speed sensors (29a) associated with a right one of the pair of rear wheels (11a) to produce a fourth wheel speed signal;

a first approximate vehicle speed signal generator (36a) connected to the right front wheel speed signal generator (34a) and to the left rear wheel speed signal generator (35a) to produce a first approximate vehicle speed signal;

a second approximate vehicle speed signal generator (36b) connected to the left front wheel speed signal generator (34b) and to the right rear wheel speed signal generator (35b) to produce a second approximate vehicle speed signal;

a first slip measure (37a) connected to the left rear wheel speed signal generator (35a) and toe the first approximate vehicle speed signal generator (36a) to produce a right slip measure signal;

a second slip measure (37b) connected to the right rear wheel speed signal generator (35b) and toe the second approximate vehicle speed signal generator (36b) to produce a left slip measure signal;

a slip comparator (38) connected to the first and second slip measures (37a and 37b) to produce a compared slip signal;

an inverter (48) connected to the slip comparator (38) to produce an inverted compared slip signal;

a first high select (39a) connected to the wheel speed signal generators (34a and 35a) and to the slip comparator (38) to select the higher of the wheel speed signals;

a first low select (40a) connected to the wheel speed signal generators (34a and 35a) and to the inverter (48) to select the lower of the wheel speed signals;

a second high select (39b) connected to the wheel speed signal generators (34b and 35b) and to the inverter (48) to select the higher of the wheel speed signals;

a second low select (40b) connected to the wheel speed signal generators (34b and 35b) and to the slip comparator (38) to select the lower of the wheel speed signals;

a first skid signal generator (41a) connected to the first high select (39a), the first approximate vehicle speed signal generator (36a) and the first low select (40a) to produce a first skid signal;

a second skid signal generator (41b) connected to the second high select (39b), the second approximate vehicle speed signal generator (36b) and the second low select (40b) to produce a second skid signal;

a first logic unit (42a) connected to the first skid signal generator (41a) to produce a first logic signal;

a second logic unit (42b) connected to the second skid signal generator (41b) to produce a second logic signal;

a first amplifier (43a) connected to the first logic unit (42a) to produce a signal that is taken to the first fluid pressure control device; and a second amplifier (43b) connected to the second logic unit (42b) to produce a signal that is taken to the second fluid pressure control device, the control unit receiving outputs of said wheel speed sensors for judging the skid conditions of said front and rear wheels and for generating instructions for controlling said first and second fluid, whereby pressure control valve device, whereby said control unit comprises a discriminating circuit means for discriminating between the frictionally lower one and higher one of the sides of the road on which said wheels are running, on the basis of the judging results of the skid conditions of said rear wheels, and a control circuit means for controlling the braking pressure of the one rear wheel on the low side and of the one front wheel connected diagonally to said one rear wheel in a "select-high" manner, and the braking pressures of the other rear wheel on the high side and of the other front wheel connected diagonally to said other rear wheel in a "select-low" manner.

2. An anti-skid control apparatus according to claim 1, in which said discrimination circuit means judges the one side of the road on which the one of the rear wheels is running in more slip than the other of them, to have a smaller frictional coefficient, and the other side of the road on which the other of the rear wheels is running in less slip than the one of them, to have a larger frictional coefficient.

3. An anti-skid control apparatus according to claim 1, in which the one side of the road on which the one of the rear wheels is running at a lower wheel speed than the other of them, is judged to have a smaller functional coefficient, and the other side of the road on which the other of the rear wheels is running at a higher wheel speed than the one of them, is judged to have a larger frictional coefficient.

4. An anti-skid control apparatus according to claim 1, in which the one side of the road on which the one of the rear wheels to be locked at a lower pressure than the other of them is running, is judged to have a smaller frictional coefficient, and the other side of the road on which the other of the rear wheels to be locked at a higher pressure than the one of them is running, is judged to have a higher frictional coefficient.

5. An anti-skid control apparatus according to claim 1, in which the one side of the road on which the one of the rear wheels, which has generated a control signal sooner than the other of them, is running, is judged to have a smaller frictional coefficient, and the other side of the road on which the other of the rear wheels is running, is judged to have a higher frictional coefficient.

6. In an anti-skid control apparatus for a vehicle braking system including:
(A) a pair of front wheels and a pair of rear wheels which are diagonally connected with each other;
(B) wheel speed sensors associated with said wheels, respectively;
(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
(D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
(E) a control unit comprising: a right front wheel speed signal generator (34a) connected to a one of the wheel speed sensors (28a) associated with a right one of the pair of front wheels (6a) to produce a first wheel speed signal;
a left rear wheel speed signal generator (35a) connected to a one of the wheel speed sensors (29b) associated with al eft one of the pair of rear wheels (11b) to produce a second wheel speed signal;
a left front wheel speed signal generator (34b) connected to a one of the wheel speed sensors (28b) associated with a left one of the pair of front wheels (6b) to produce a third wheel speed signal;
a right rear wheel speed signal generator (35b) connected to a one of the wheel speed sensors (29a) associated with a right one of the pair of rear wheels (11a) to produce a fourth wheel speed signal;
a first approximate vehicle speed signal generator (36a) connected to the right front wheel speed signal generator (34a) and to the left rear wheel speed signal generator (35a) to produce a first approximate vehicle speed signal;
a second approximate vehicle speed signal generator (36b) connected to the left front wheel speed signal generator (34b) and to the right rear wheel speed signal generator (35b) to produce a second approximate vehicle speed signal;
a first slip measure (37a) connected to the left rear wheel speed signal generator (35a) and to the first approximate vehicle speed signal generator (36a) to produce a right slip measure signal;
a second slip measure (37b) connected to the right rear wheel speed signal generator (35b) and to the second approximate vehicle speed signal generator (36b) to produce a left slip measure signal;
a slip comparator (38) connected to the first and second slip measures (37a and 37b) to produce a compared slip signal;
an inverter (48) connected to the slip comparator (38) to produce an inverted compared slip signal;
a first high select (39a) connected to the wheel speed signal generators (34a and 35a) and to the inverter (48) to select the higher of the wheel speed signals;
a first low select (40a) connected to the wheel speed signal generators (34a and 35a) and to the slip comparator (38) to select the lower of the wheel speed signals;

a second high select (39b) connected to the wheel speed signal generators (34b and 35b) and to the slip comparator (38) to select the higher of the wheel speed signals;

a second low select (40b) connected to the wheel speed signal generators (34b and 35b) and to the inverter (48) to select the lower of the wheel speed signals;

a first skid signal generator (41a) connected to the first high select (39a), the first approximate vehicle speed signal generator (36a) and the first low select (40a) to produce a first skid signal;

a second skid signal generator (41b) connected to the second high select (39b), the second approximate vehicle speed signal generator (36b) and the second low select (40b) to produce a second skid signal;

a first logic unit (442a) connected to the first skid signal generator (41a) to produce a first logic signal;

a second logic unit (42b) connected to the second skid signal generator (41b) to produce a second logic signal;

a first amplifier (43a) connected to the first logic unit (42a) to produce a signal that is taken to the first fluid pressure control device; and a second amplifier (43b) connected to the second logic unit (42b) to produce a signal that is taken to the second fluid pressure control device, the control unit receiving outputs of said wheel speed sensors for judging the skid conditions of said front and rear wheels and for generating instructions for controlling said first and second fluid pressure control valve devices, whereby said control unit comprises a discriminating circuit for discriminating between the fictionally lower one and higher one of the sides of the road on which said wheels are running, on the basis of the judging results of the skid conditions of said front wheels, and the braking pressures of the one front wheel on the low side and of the one rear wheel connected diagonally to said one front wheel are controlled in a "select-low" manner, and the braking pressures of the other front wheel on the high side and of the other rear wheel connected diagonally to said other front wheel are controlled in a "select-low" manner.

7. An anti-skid control apparatus according to claim 6, in which said discriminating circuit means judges the one side of the road on which the one of the front wheels is running in more slip than the other of them, to have a smaller frictional coefficient, and the other side of the rod on which the other of the front wheels is running in less slip than the one of them, to have a larger frictional coefficient.

8. An anti-skid control apparatus according to claim 6, in which the one side of the road on which the one of the front wheels is running at a lower wheel speed than the other of them, is judged to have a smaller frictional coefficient, and the other side of the road on which the other of the front wheels is running at a higher wheel speed than the one of them, is judged to have a larger frictional coefficient.

9. An anti-skid control apparatus according to claim 6, in which the one side of the road on which the one of the front wheels to be locked at a lower pressure than the other of them is running, is judged to have a smaller frictional coefficient, and the other side of the road on which the other of the front wheels to be locked at a higher pressure than the one of them is running, is judged to have a higher frictional coefficient.

10. An anti-skid control apparatus according to claim 6, in which the one side of the road on which the one of the front wheels, which has generated a control signal sooner than the other of them, is running, is judged to have a smaller frictional coefficient, and the other side of the road on which the other of the front is running, is judged to have a higher frictional coefficient.

* * * * *